US009092962B1

(12) United States Patent
Merrill et al.

(10) Patent No.: US 9,092,962 B1
(45) Date of Patent: Jul. 28, 2015

(54) DIVERSITY NETWORKS AND METHODS FOR SECURE COMMUNICATIONS

(75) Inventors: Charles Merrill, Cornelius, NC (US); Kevin Charles Kriegel, Highland Park, IL (US); Roger Allen Nolte, Concord, NC (US); Barclay J. Tullis, Palo Alto, CA (US)

(73) Assignee: KONTEK INDUSTRIES, INC., Kannapolis, NC (US)

( * ) Notice: Subject to any disclaimer, the term of this patent is extended or adjusted under 35 U.S.C. 154(b) by 566 days.

(21) Appl. No.: 12/877,754

(22) Filed: Sep. 8, 2010

Related U.S. Application Data

(60) Provisional application No. 61/325,157, filed on Apr. 16, 2010.

(51) Int. Cl.
*G06F 15/173* (2006.01)
*G08B 25/00* (2006.01)
*G08B 25/01* (2006.01)
*G08B 25/08* (2006.01)

(52) U.S. Cl.
CPC .............. *G08B 25/004* (2013.01); *G08B 25/00* (2013.01); *G08B 25/01* (2013.01); *G08B 25/08* (2013.01)

(58) Field of Classification Search
CPC ...... G08B 25/004; G08B 25/00; G08B 25/01; G08B 25/08
See application file for complete search history.

(56) References Cited

U.S. PATENT DOCUMENTS 5,056,107 A 10/1991 Johnson
5,278,867 A 1/1994 Sehier
6,801,499 B1 10/2004 Anandakumar
6,868,083 B2 3/2005 Apostolopoulos
6,989,745 B1 1/2006 Milinusic
7,099,277 B2 * 8/2006 Sahinoglu et al. ............ 370/238
7,144,186 B1 * 12/2006 Nolte ........................... 256/13.1
7,144,187 B1 12/2006 Nolte
7,654,768 B1 2/2010 Tullis (Continued)

OTHER PUBLICATIONS

Pending U.S. Appl. No. 12/618,699, filed Nov. 13, 2009 by Tullis; Barclay J., Nolte; Roger Allen, Merrill; Charles and titled "Method of Protection with Massive Security Barriers Having Tie-Bars in Tunnels" (a division of U.S. Patent No. 7,654,768 issued Feb. 2, 2010).

(Continued)

*Primary Examiner* — Patrice Winder
*Assistant Examiner* — Nam Tran
(74) *Attorney, Agent, or Firm* — Barclay J. Tullis

(57) ABSTRACT

Security systems may include sensing, networked communications, stealth, alarms, and countermeasures, any or all of which may adapt to threats. These systems may also include armor and barriers of concrete and/or steel. They can adapt to severity of threats, weather, and/or other situational aspects. They can anticipate at least some threats in order to obtain early warning and react more quickly to those threats. They can adapt by altering their configurations, including alterations in communication networking structures and methods, and changes in data-storage and processing duties at processing nodes. Defensive and/or offensive countermeasures can be employed to deter, confuse, trap, and/or disable terrorists. The systems are capable of self-maintenance, self-healing, and self-restoration as threats subside. The systems can include subsystems capable of autonomous operation. At least some of the systems and/or their subsystems are capable of allocating power among subsystems, and of regulating bandwidth utilizations.

27 Claims, 14 Drawing Sheets

(56) References Cited

U.S. PATENT DOCUMENTS

| | | | | |
|---|---|---|---|---|
| 7,661,228 | B1 | 2/2010 | Nolte | |
| 7,701,858 | B2 | 4/2010 | Werb | |
| 7,823,360 | B1 | 11/2010 | Cottle | |
| 8,588,115 | B2 * | 11/2013 | Gao et al. | 370/310 |
| 2002/0176712 | A1 | 11/2002 | Brown | |
| 2004/0113790 | A1 * | 6/2004 | Hamel et al. | 340/572.1 |
| 2004/0168389 | A1 | 9/2004 | Marsh et al. | |
| 2004/0218609 | A1 * | 11/2004 | Foster et al. | 370/401 |
| 2005/0257466 | A1 | 11/2005 | Tabeshnekoo | |
| 2006/0031934 | A1 * | 2/2006 | Kriegel | 726/22 |
| 2008/0111885 | A1 * | 5/2008 | Voglewede et al. | 348/152 |
| 2010/0039261 | A1 * | 2/2010 | Piper et al. | 340/555 |

OTHER PUBLICATIONS

Pending U.S. Appl. No. 12/618,701, filed Nov. 13, 2009 by Tullis; Barclay J., Nolte; Roger Allen, Merrill; Charles and titled "Segmented Massive Security Barriers Having Tie-Bars in Tunnels" (a division of U.S. Patent No. 7,654,768 issued Feb. 2, 2010).

Pending U.S. Appl. No. 12/629,041, filed Dec. 1, 2009 by Nolte; Roger Allen, Selke; Donald L. and titled "Armored Building Modules and Panels—Insertion and Removal" (a division of U.S. Patent No. 7,661,228 issued Feb. 16, 2010).

Pending U.S. Appl. No. 61/325,157, filed Apr. 16, 2010 by Charles Merrill, Kevin Charles Kriegel, Allen Roger Nolte, Barclay J. Tullis and titled "Security Systems Having Armored, Sensory, Adaptive, Stealthy, and/or Autonomous Means".

U.S. Appl. No. 12/877,670, filed Sep. 8, 2010 by Charles Merrill, Kevin Charles Kriegel, Allen Roger Nolte, Barclay J. Tullis and titled "Security Systems Having Communication Paths in Tunnels of Barrier Modules and Armored Building Modules".

U.S. Appl. No. 12/877,728, filed Sep. 8, 2010 by Charles Merrill, Kevin Charles Kriegel, Allen Roger Nolte, Barclay J. Tullis and titled "Security Systems with Adaptive Subsystems Networked through Barrier Modules and Armored Building Modules".

U.S. Appl. No. 12/877,794, filed Sep. 8, 2010 by Charles Merrill, Kevin Charles Kriegel, Allen Roger Nolte, Barclay J. Tullis and titled "Autonomous and Federated Sensory Subsystems and Networks for Security Systems".

U.S. Appl. No. 12/877,816, filed Sep. 8, 2010 by Charles Merrill, Kevin Charles Kriegel, Allen Roger Nolte, Barclay J. Tullis and titles "Global Positioning Systems and Methods for Asset and Infrastructure Protection".

* cited by examiner

DIVERSITY NETWORKS AND METHODS FOR SECURE COMMUNICATIONS

CROSS-REFERENCE TO RELATED APPLICATIONS

This Non-provisional patent application claims the benefit of U.S. Provisional application No. 61/325,157, filed Apr. 16, 2010, hereby incorporated by reference. This application also relates to co-owned Non-provisional patent applications simultaneously-filed on Sep. 8, 2010 along with the present application and titled "Security Systems Having Communication Paths in Tunnels of Barrier Modules and Armored Building Modules", and application Ser. No. 12/877,670; "Security Systems with Adaptive Subsystems Networked through Barrier Modules and Armored Building Modules", and application Ser. No. 12/877,728, now U.S. Pat. No. 8,674,831; "Autonomous and Federated Sensory Subsystems and Networks for Security Systems", and application Ser. No. 12/877,794, now U.S. Pat. No. 8,384,542; and "Global Positioning Systems and Methods for Asset and Infrastructure Protection", and application Ser. No. 12/877,816, now U.S. Pat. No. 8,471,700; the disclosures of which are hereby incorporated by reference in their entireties.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to security systems for protecting facilities, personnel, and communications in a defined area from military or terrorist threats such as hostile forces, fire arms, mortars, explosives, and/or attack vehicles.

2. Description of the Related Art

Security zones for protecting groups of people and facilities be they private, public, diplomatic, military, or other, can be dangerous environments for people and property if threatened by military acts or acts of terrorism. The prior arts in security systems and armored protection provide some solutions but fall far short of being synergistically integrated.

In the prior art, automated security systems sense disturbances to an ambient condition and cause alarms to be activated, but these systems fall short of being able to identify many cause(s) of a disturbance. U.S. Patent Application Publication No. 2006/0031934 by Kevin Kriegel titled "Monitoring System", incorporated herein by reference in its entirety, discloses a system that monitors and controls devices that may sense and report a location's physical characteristics through a distributed network. Based on sensed characteristics, the system may determine and/or change a security level at a location. The system may include a sensor, an access device, and a data center. The sensor detects or measures a condition at a location. The access device communicates with the sensor and the data center. The data center communicates with devices in the system, manages data received from the access device, and may transmit data to the access device.

Rows of concrete barrier blocks (i.e. rows of concrete barrier modules) that can slide across the ground can stop and destroy terrorist vehicles that collide with them, and can protect against blast waves and blast debris, but they offer no earlier warning signals of threats. U.S. Pat. No. 7,144,186 to Roger Allen Nolte titled "Massive Security Barrier", U.S. Pat. No. 7,144,187 to Roger Allen Nolte and Barclay J. Tullis titled "Cabled Massive Security Barrier", and U.S. Pat. No. 7,654,768 to Barclay J. Tullis, Roger Allen Nolte, and Charles Merrill titled "Massive Security Barriers Having Tie-Bars in Tunnels", all incorporated herein by reference in their entireties, disclose barrier modules and barriers constructed of barrier modules. U.S. Pat. No. 7,144,186 discloses barrier modules, each with at least one rectangular tie-bar of steel cast permanently within concrete or other solid material and extending longitudinally between opposite sides of the barrier module, wherein adjacent barrier modules are coupled side-against-side by means of strong coupling devices between adjacent tie-bars, and wherein no ground penetrating anchoring means is involved. But since the tie-bars are cast within the barrier modules, they cannot be changed out or upgraded without removing and replacing the solid material as well. However, U.S. Pat. No. 7,144,187 discloses barrier modules of solid material with tunnels extending between opposite sides, wherein adjacent barrier modules are coupled side-against-side with cables passing through the tunnels and anchored to sides of at least some of the barrier modules by anchoring devices. And U.S. Pat. No. 7,654,768 discloses barrier modules that have tie-bars in tunnels that extend longitudinally between opposite sides of a barrier module.

Armored steel guard houses and other armored structures for buildings provide some protections to their occupants, but also do not integrate conveniently with communication infrastructure needed to support an electronic security system. However, U.S. Pat. No. 7,661,228 to Roger Allen Nolte and Donald L. Selke titled "Armored building modules and panels", incorporated herein by reference in its entirety, discloses armored building elements that not only have open channels running throughout their length, but also create an open channel between any two that are abutted side-by-side to one-another, and it is these channels that afford much of the structures resistance to mortar and ballistic weaponry.

BRIEF SUMMARY OF THE INVENTION

The present invention exploits properties of the inventions disclosed in the above-mentioned four patents and one patent application publication in ways not previously discovered to advance convergence of physical and cyber security. Given the present disclosure, it can be realized that what was needed and what is provided by the inventions disclosed by the present disclosure are security systems that synergistically integrate and exploit these prior arts to realize the following:

a) use of tunnels to protect communications and power lines within security barriers that comprise strongly interconnected barrier modules that don't penetrate the ground and that will slide over the ground rather than break loose and become disconnected from one-another when challenged by a terrorist vehicle or explosive blast, b) use of these same barriers modules to house sensors and equipment, c) use of channels within armored steel building modules to protect communications lines and to house sensors and equipment, d) use of meaningful information derived from combinations of these and other sensors, e) use of redundant and dynamically alterable communications networks of various forms and types, f) use of countermeasures, g) use of power and bandwidth conservation techniques, h) use of electronic subsystems capable of autonomous operation, i) use of stealth, and j) use of system-level management including tie-ins to Tactical Operations Centers and Network Operations Centers.

The inventions are pointed out with particularity in the appended claims. However, some aspects of the invention are summarized herein.

The inventions include security systems that can include sensing, networked communications, alarms, countermeasures, and stealth, any or all of which may adapt to threats. These systems may also include and be physically and synergistically integrated with barrier modules, with armored building modules, and with other security structures of concrete, steel, or more exotic materials. They can adapt to severity of threats, weather, and/or other situational aspects. They can anticipate at least some threats in order to obtain early warning and react more quickly to those threats. They can adapt by altering their configurations, including alterations in communication networking structures and methods, and changes in data-storage and processing duties within subsystems and processing nodes. Defensive and/or offensive countermeasures can be part of such security systems and be employed to deter, confuse, trap, and/or disable terrorists. Countermeasures may include defensive or offensive weapons as well as emitters of other disturbances (i.e. disturbance emitters) such as loud noises or bright flashes of light. Examples of non-lethal weapons include water canons, emitters of loud sounds or shock waves, microwave emitters that inflict discomfort, automated guns that shoot stunning pellets, emitters of noxious gases, emitters of bright light, and more. Examples of lethal weapons include automatic guns with real ammunition, canons, blinding laser emitters, destructive shock-wave emitters, high-voltage surfaces, high-voltage projected barbs, missiles, deployable tanks, vehicle rams, and more. The systems and/or their subsystems can be capable of self-maintenance, self-healing, and self-restoration as threats subside. The systems can include subsystems that are capable of autonomous operation and/or capable of operating as cooperating members in a federation of subsystems that are in communication with one-another. Such autonomous and/or federated subsystems are able to operate without communication with a main monitor and control subsystem when desirable for reason of stealth or in response to being cut-off from the main monitor and control center (at least until reconnected to a monitor and control subsystem). At least some of the systems and/or their subsystems are capable of allocating and/or conserving power among subsystems, and of regulating and/or reducing bandwidth utilizations, both particularly in response to a terrorist threat or other constraint placed on the system.

Other aspects of the invention as demonstrated in the disclosed example embodiments include the following. Security barriers with tunnels and cavities can be used to a) protect and route communication and power cables, b) house and protect sensors and other equipment including power sources and transceivers, and c) enhance an electronic security system by extending coverage to the security barrier and its surrounding environment. Armored building modules can be used to provide these same advantages, but in addition can be used to a) protect cables along the outside surfaces of security barriers and/or barrier modules and b) hide and protect cables beneath the ground. Security sensors can be used that a) adjust their own detection thresholds after requesting authority to do so, b) seek corroboration of threshold-crossing events by analyzing data and/or information from other sensors for correlations, c) purposefully induce changes to a sensor's environment by controlling use of countermeasures or other disturbance emitters, d) use one or more deduction and inference engines, e) work in groups to derive additional sensory information, and f) derive information from combinations of sensor signals. Secure sensors can use a) sensor ID's, b) encryption of data, c) scheduled or un-scheduled times for communication, and d) diversity communications. Security systems can a) use and exploit communication diversities, b) use overlapping networks, c) transform themselves in defense and offense, and d) exploit barrier modules and armored building modules (and security barriers and paneling modules in general) and even use them as continuity sensors. Security systems can include a) autonomous subsystems, b) autonomous subsystems that can federate into a mutually supporting and synergistic group, and c) federated methods of deception, stealth, robustness, and power and bandwidth conservation. Security Systems can take countermeasures (lethal and/or non-lethal). Security systems can use conservation means to conserve power and/or bandwidth. Security systems can geo-track sensors and other assets (other personnel or equipment).

OBJECTS AND ADVANTAGES OF THE INVENTION

Objects and advantages of the present invention include security systems that significantly out-perform those of the prior art by synergistically integrating electronic security systems with physical security systems, and/or by synergistically adding: collective analyses of signals from multiple and/or dissimilar sensors; dynamic adaptations in sensor utilizations; and dynamic adaptations in communication structures and methods, countermeasures, and stealth. The objects and advantages are also to achieve security systems that are armored and pro-active in the use of response tactics and in the use of sensors and artificial intelligence to improve responses to conditions indicative of potential threats.

Further advantages of the present invention will become apparent to ones skilled in the art upon examination of the accompanying drawings and the following detailed description. It is intended that any additional advantages be incorporated herein.

The various features of the present invention and its preferred embodiments and implementations may also be better understood by referring to the accompanying drawings and the following detailed description. The contents of the following description and of the drawings are set forth as examples only and should not be understood to represent limitations upon the scope of the present invention.

BRIEF DESCRIPTION OF THE SEVERAL VIEWS OF THE DRAWINGS

The foregoing objects and advantages of the present invention for armored and pro-active security systems may be more readily understood by one skilled in the art with reference being had to the following detailed description of several embodiments thereof, taken in conjunction with the accompanying drawings. Within these drawings, callouts using like reference numerals refer to like elements in the several figures (also called views) where doing so won't add confusion, and alphabetic-letter-suffixes where used help to identify copies of a part or feature related to a particular usage and/or relative location. The use of primes on the callouts are used mostly for distinguishing, in the views, a right-hand side or end of an element from the left-hand side or end of that element. Within these drawings.

DETAILED DESCRIPTION OF THE INVENTION

Figure 1:
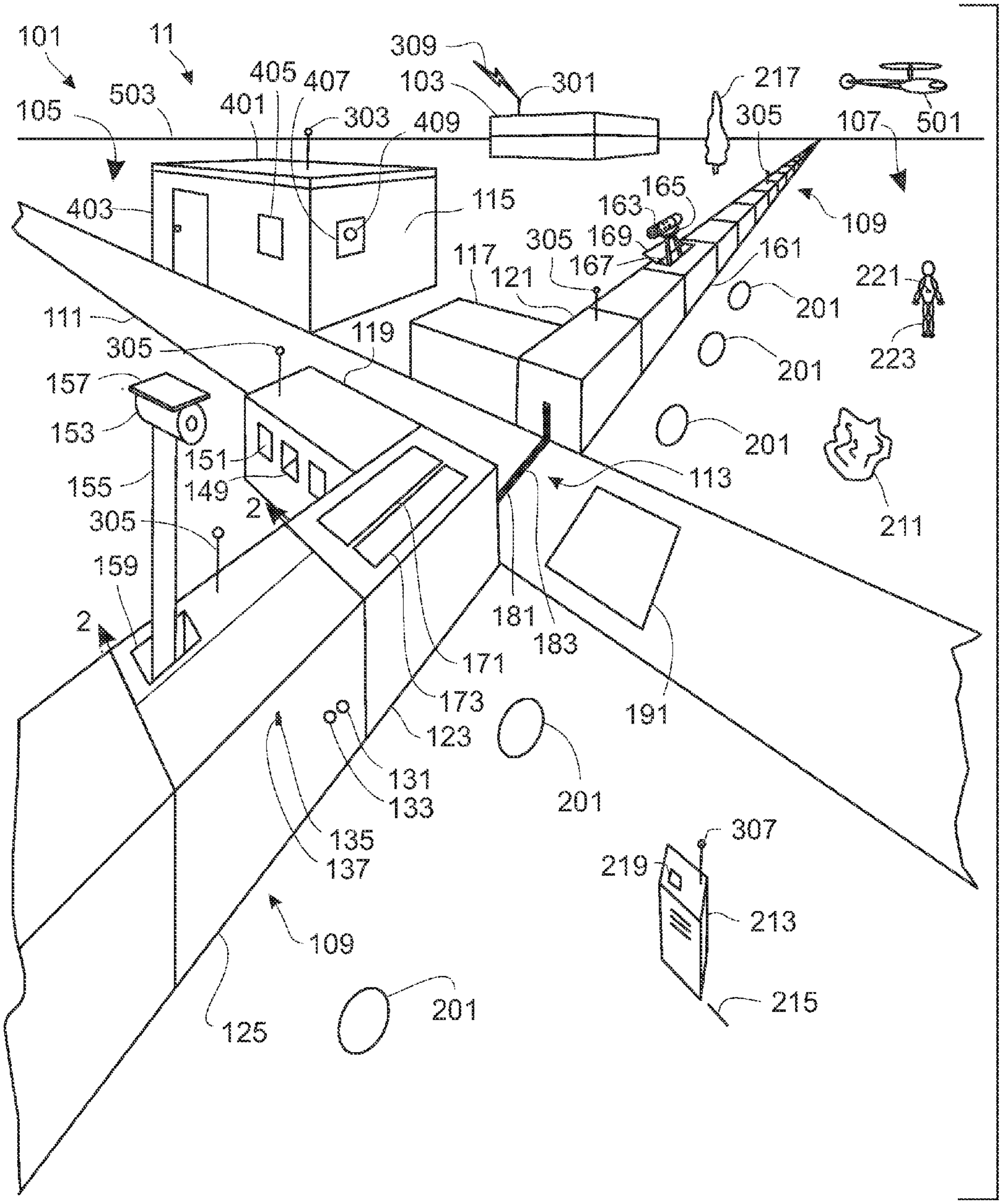
FIG. 1 shows a perspective view of a security site, from near an entrance gate with a guard house, protected by an armored security system.

The following is a detailed description of the invention and its preferred embodiments as illustrated in the drawings. While the invention will be described in connection with these drawings, there is no intent to limit it to the embodiment or embodiments disclosed. On the contrary, the intent is to cover all alternatives, modifications and equivalents included within the spirit and scope of the invention as defined by the appended claims.

FIG. 1 shows a perspective view of a security site 101 protected by an armored security system 11. The location of a centralized monitoring and control subsystem 103 is in a secure region 105 separated physically from an unsecure region 107 by a security barrier 109 (which may or may not be at least partly camouflaged or decorated with images to fool a viewer) shown here as a row or series of barrier modules. Within this disclosure and claims, the terms "barrier module" and "barrier block" are defined to mean one of those patented by the following patents: a) U.S. Pat. No. 7,144,186 to Roger Allen Nolte titled "Massive Security Barrier", b) U.S. Pat. No. 7,144,187 to Roger Allen Nolte and Barclay J. Tullis titled "Cabled Massive Security Barrier", and c) U.S. Pat. No. 7,654,768 to Barclay J. Tullis, Roger Allen Nolte, and Charles Merrill titled "Massive Security Barriers Having Tie-Bars in Tunnels", all incorporated herein by reference in their entireties. Also within this disclosure and claims, the terms "security barrier" and "blocks" (i.e. without the modifier "barrier" immediately preceding them) are used more generally to mean a barrier that provides security, however when a security barrier comprises barrier modules (also called barrier blocks), then at least some of the adjacent barrier modules within such a security barrier will be defined to be coupled together (i.e. interconnected) according to at least one of the aforementioned three patented inventions. An access roadway 111 runs through an access gateway 113 providing access between the two areas 105,107. A guard house 115 stands porter at the access gateway 113. A first gateway extension barrier module 117 and a second gateway extension barrier module 119 together provide additional length to the access gateway 113 along the access roadway 111. A first gateway-opening barrier module 121 and a second gateway-opening barrier module 123 border the opening in the security barrier 109. One or more additional parts of the current invention can be hidden beneath the roadway 111 at a location illustrated as a rectangle just outside the access gateway 113.

FIG. 1 also shows a barrier module 125 with camera 153. On the side of this barrier module 125 that faces the unsecure region 107 are shown a first access hole 131 and a second access hole 133 in the barrier module 125. These access holes 131, 133 (which may be of any shape and not just circular as shown) run into the barrier module 125 to at least one cavity within the barrier module 125 and can be used as an airway to that cavity as well as a path along which to extend a sensor probe, such as a small camera, outside the barrier module 125. Such a camera can hide within the barrier module 125 and be automatically extended and manipulated to look outward from the barrier module 125 or back and forth along the length of the security barrier 109, as when searching for a person attempting to hide along the security barrier 109. Another camera is shown as pop-out camera 135, shown sticking out of a camera portal 137 on the non-secure side of the barrier modules 125. Such access holes 131, 133 (and camera portals 137 with pop-out cameras 135) may also be located on the secure side and/or the top of the barrier module 125 to achieve other views outside the barrier module 125. In some embodiments of the invention, image sensors such as the pop-out camera 135 can be controlled from a sensor subsystem within the barrier to pop out and capture still images and/or video of environment surrounding the security barrier 109. If such cameras are made to briefly pop out and back into the barrier again at unpredictable times, it would be difficult for a terrorist to anticipate their presence and defeat them. Furthermore given the significant quantity of barrier modules used in a security barrier 109, it would be difficult to defeat all of them at once. On a side of the barrier module 119 that faces the secure region 105 are shown at least a cavity 149 within the barrier module 119 and a door 151 to a sensor or device within the barrier module 119. A surveillance camera 153 is shown supported by an extendable arm 155. On top of the camera 153 is shown a door panel 157 that covers a camera cavity 159 within the barrier module 125 when the camera 153 is retracted into the barrier module 125. It should be observed in this illustration and embodiment that the security barrier 109 includes a row of barrier modules set on the ground 215 (e.g. barrier modules 117, 119, 121, 123, 125, 161) and not stacked vertically with other blocks.

FIG. 1 also shows a barrier module with a gun 161, where the gun 163 is mounted on an extendable gun mount 165 that is normally housed within a gun cavity 167 in the barrier module 161. A door 169 to the gun cavity 167 is also shown.

FIG. 1 also shows a door 171 on top of barrier module 123, where the door 171 can be to a sensor or device housed within the barrier module 123. Alongside the door 171 is shown a solar panel 173 that can collect power that can be used in charging batteries within the barrier modules for powering communications subsystems, sensors, cameras, guns, and other barrier accessories normally housed within one or more barrier modules.

FIG. 1 also shows a securing cable 183 across the access gateway 113. The securing cable 183 is anchored at both the first and second gateway-opening barrier modules 121,123, and it is show hidden within a slot 181 within the access roadway 111. By way of a take-up mechanism within at least one of the gateway-opening barrier modules 121,123, this securing cable 183 can be lifted out of the slot 181 and pulled tightly across the access gateway 113 as a countermeasure for physically blocking the access gateway 113 when needed to deter or stop entry of a threatening vehicle.

FIG. 1 also shows underground sensor devices 201 placed outside the security barrier 109 in numerous locations within the unsecure region 107. These sensor devices 201 may be ground vibration sensors or weight sensors such as to sense a person walking or a vehicle traveling nearby, gas sensors, proximity sensors, or any other type of sensor that could give early warning to a monitoring and control subsystem of the presence or activity of a potential terrorist or of other threatening disturbances in the environment outside the secure region 105.

FIG. 1 also shows a first sensor 211 hidden in a plant or disguised as a plant. In the foreground of the view, and in the unsecure region 107, is shown a sensing device 213 or subsystem that may be real, a decoy, a device that provides misinformation, or a countermeasure device. An RFID (radio-frequency identification device) 219 is shown on the sensing system 213. Such RFID devices can be attached to any or all of the objects comprised by the security system 11. And a person 223 is shown wearing a GPS (global positioning device) 221. Such GPS devices could also be made part of any or all of the objects and/or subsystems comprised by the security system 11, and alarms conditions could be set by movement of any of them outside their respective predefined boundaries. Also shown is the surface of the ground 215. A friendly person known not to be a terrorist can be given a GPS by which he/she could be tracked, and by which the sensor and higher-level subsystems of the security system 11 could be made to assure that person's presence and activities don't set off any alarms. In the distance, and in the secure region 105, is shown another sensor 217 hidden in a tree (or disguised as a tree).

FIG. 1 also shows an antenna 301 at the location of a centralized monitoring and control subsystem 103. The centralized monitoring and control subsystem 103 is shown here as located within a building. Not shown, and maybe located at the same location as the centralized monitoring and control subsystem 103, would be a Tactical Operations Center (TOC) and perhaps also a Network Operations Center (NOC) both of which would be in communication with the armored security system 11. Another antenna 303 is shown on the guard house 115. Another antenna 305 is shown on a barrier module. Another antenna 307 is shown on the real or decoy sensing (or other) device 213. Signals 309 via a wireless medium are depicted being transmitted or received from the antenna 301 at the centralized monitoring and control subsystem 103.

FIG. 1 also shows the roof 401 of the guard house where the antenna 303 is mounted. The walls 403 and the roof 401 of the guard house may be constructed of armored steel building modules having side-lap overhangs. Within this disclosure and claims, the terms "armored building module" and "building module" are defined to mean one of those patented by U.S. Pat. No. 7,661,228 to Roger Allen Nolte and Donald L. Selke titled "Armored building modules and panels", incorporated herein by reference in its entirety. A first window 405 is shown on the guard house along with a second window 407. Within the second window 407 is shown an opaque armor filling the window but having a peep hole 409. This window armor with the peep hole 409 can be taken away or replaced automatically in response to perceived threats.

FIG. 1 also shows an airplane 501 in flight which may provide additional sensory and observational inputs along with the other sensors mentioned above, as well as countermeasure options, to the armored security system 11. A horizon 503 is also shown.

All of the objects shown in FIG. 1, with the possible exception of perhaps the horizon 503 and the ground 215, are comprised by at least some of the embodiments of the invention.

Figure 2:
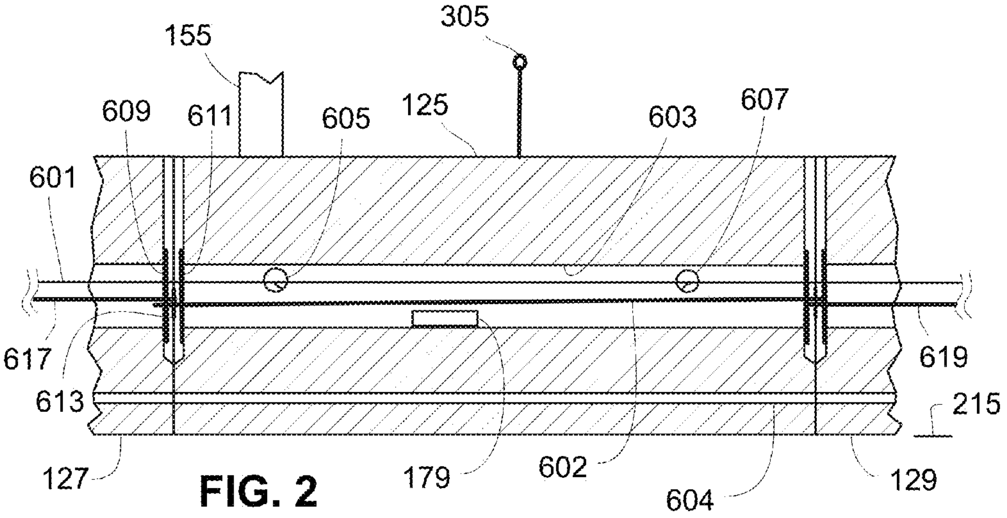
FIG. 2 shows a cross-section of a barrier module having a tunnel being used to house and protect communications and power cables as well as sensors and other equipment.

FIG. 2 shows a longitudinal cross-section of the barrier module 125 (also called a barrier block) having a barrier tunnel 603 through the barrier module 125, wherein the barrier tunnel 603 is used to house and protect a communication medium 601 (e.g. a communications cable). The tunnel 603 can also be called a hole through the barrier module 125. The barrier module 125 can be made substantially of concrete. The cross-section taken is that indicated by the arrows numbered 2 in FIG. 1 on the barrier module 125 with the camera 125. The communications medium 601 is shown here as a cable which may or may not have an armored outer jacket such as made of braided metal or ceramic fibers perhaps bound with a non-metallic resin, epoxy, or other glue. This communications cable 601 continues beyond this barrier module 125 in both directions as, for example, into and perhaps through similar tunnels in adjacent barrier modules forming the security barrier 109 (shown in FIG. 1 as a row of barrier modules). Two such barrier modules 127,129 are shown respectively adjacent each end of the barrier module 125. This barrier tunnel 603 can be one of the same one or more tunnels used to contain an element 602 that can be chain, steel cable, and/or one or more tie-bar(s) used to rotatably couple adjacent barrier modules to one another securely, or it can be another barrier tunnel 604 made in the barrier module 125 and similarly in adjacent barrier modules such as barrier modules 127 and 129. The tie-bars are preferably made of high-strength steel, are also called "beam(s)", and are movable within the tunnels thus leaving room for others items to fit within the tunnels. In the illustration of FIG. 2, the element 602 is shown as a tie-bar with its ends each connected by way of a respective pin 613 to similar ends in similar tie-bars 617 and 619 within the adjacent barrier modules 127,129. The elements 609,611 to either side of a pin 613 are retainer plates used to keep that pin 613 from entering tunnels of the barrier modules. The ground 215 that supports the barrier module 125 is shown, as are the previously described extendable arm 155 (that holds a camera that is retractable within a cavity inside the barrier module 125) and the antenna 305 on the barrier module 125. First and second connection tunnels 605,607 are also shown, whereas these provide access paths between the barrier tunnel 603 and cavities within the barrier module 125. The cavities house, hide, and protect equipment 179 such as sensor units, power supplies, countermeasure systems, sensor data concentrators, and communications equipment within the barrier module 125. It should be noted that the communication medium 601 routed through the barrier module 125 can serve as both an event sensor and as a location sensor should it become damaged or severed when the barrier module 125 is damaged or destroyed by a terrorist. When a barrier module is damaged or destroyed, it is also possible for the security system 11 to determine where along the security barrier 109 such an event has taken place. This is because subsystems within a barrier module that becomes damaged or destroyed may become inoperative or operate improperly and will thus be indicators to the security system 11 that those subsystems are located near a region of significant disturbance and are likely the result of a security threat. Power cables, if they are routed through and between tunnels of barrier modules, also serve as continuity sensors and therefore event-location sensors in the same manner as communication media and cables do.

Figure 2A:
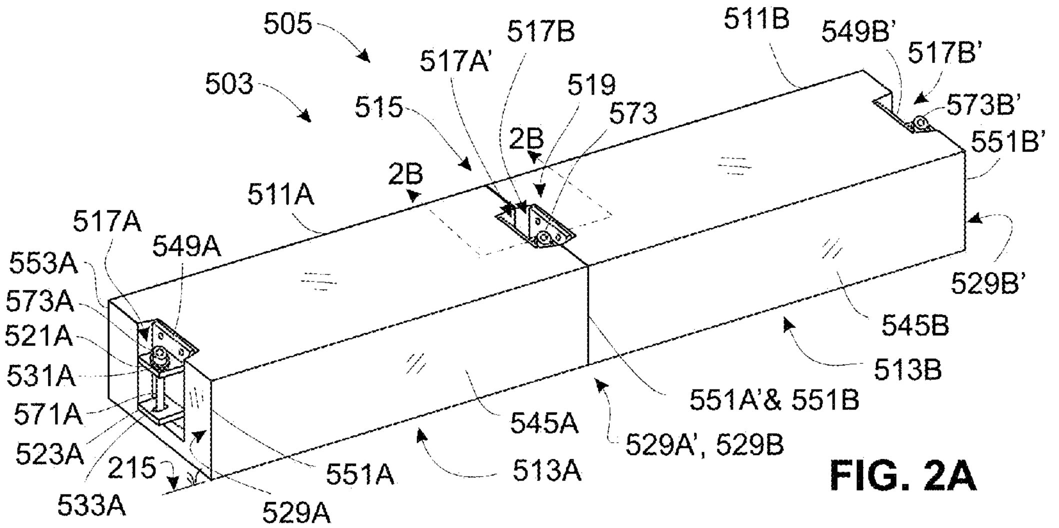
FIG. 2A shows a perspective view of a security wall in one embodiment that comprises a pair of security barrier modules.

FIG. 2A shows a perspective view of two massive security barriers 513A and 513B adjacent to one another, the massive security barrier 513A on the left and the massive security barrier 513B on the right in the view, coupled together side-against-side into a coupled pair of massive security barriers 505 to form a short security wall 507 which might stand alone or be two of many such barrier elements with a longer row or chain of similar barrier elements as modules, such as in security barrier 509 shown in FIG. 1. The barriers 513A and 513B are sitting on top of a supporting surface such as a ground surface 215. One skilled in the art should appreciate that such a supporting surface could be, for example, the ground surface of a lawn, the surface of an open field, the surface of a parking lot, the surface of a roadway, the surface of a shoulder of a roadway, the surface of a plaza, etc. In this embodiment, the massive security barrier 513A is comprised of a mass of solid material 511A and two tie-bars (561A and 563A called out in the cross-sectional view of FIG. 2B) whose left-hand ends 521A and 523A are visible in this view. Also, the massive security barrier 513B is comprised of a mass of solid material 511B and two tie-bars (561B and 563B called out in the cross-sectional view of FIG. 2B). It should be appreciated by one skilled in the art that other embodiments of the invention could be comprised of only one tie-bar per barrier, or more than two tie-bars per barrier. It should also be appreciated by one skilled in the art that other embodiments of a security wall by the invention can be comprised of a row of multiple barriers preferably numbering greater than merely the two illustrated. Note that front vertical edges are also shown as edge 551A on barrier 513A, and edge 551B' on barrier 513B. A rear vertical edge 553A on barrier 513A is also shown.

In regard to FIG. 2A, the mass of solid material 511A has two opposite sides 529A and 529A', and the mass of solid material 511B has two opposite sides 529B and 529B'. The two masses of solid material 511A and 511B are shown adjacent to one another with sides 529A' and 529B against one another (i.e. at least nearly touching one another) thereby defining an interface region 515. Within each side of each barrier is a cavity into which the one or more tie-bars associated with that barrier penetrate. The mass of solid material 511A of barrier 513A has cavities 517A and 517A'. The mass of solid material 511B of barrier 513B has cavities 517B and 517B'. Tie-bar ends 521A and 523A are visible in this view extending into cavity 517A at the far left of the view. In cavity 517A at the left end of the security wall 507, a coupling pin 571A is visible along with its head 573A. The coupling pin 571A extends through both tie-bar ends 521A and 523A, through hole 533A in the lower tie-bar 523A and hole 531A (not visible in this view, but similar to hole 533A) in the upper tie-bar 521A.

In regard to FIG. 2A, holes such as hole 533A are in both ends of each tie-bar and are oval shaped with extension parallel to the length-wise dimension of its corresponding tie-bar. Such extensions can accommodate deviations in the accuracy of the placement of the holes when inserting a coupling pin (such as coupling pin shown with head 573 in this view between the two barriers 513A and 513B) during installation of a security wall (such as 507). These oval shaped holes are also used to alleviate tension between coupled tie-bars during the very initial interaction between coupled barriers when a security wall of which the barriers are apart is first struck by a moving vehicle, a period in time during which the security wall begins to change shape as barriers begin to slide across the supporting surface 535 and as some of the masses of solid material that interfere with mutual rotation of adjacent barriers begins to break away.

In regard to FIG. 2A, also visible is a retainer 549A that both tie-bars with ends 521A and 523A extend through. In cavity 517B' at the right end of the security wall 507, the head 573B' is visible of coupling pin 571B' (the body of pin 571B' is not visible in this view) along with a retainer 549B', both in a similar arrangement as the coupling pin 571A and retainer 549A shown at the left end of the security wall 507, only attached to the tie-bars of barrier 513B instead. Within the interface region 515, the cavity 517A' of barrier 513A and the cavity 517B of barrier 513B together form a combined cavity 519 between these adjacent barriers 513A and 513B. Within this combined cavity 519, the head 573 of a coupling pin 571 (pin 573 is not visible or labeled in this view but is visible and labeled in the sectional view of FIG. 2B) and two retainers (not labeled in this view but labeled in the sectional view of FIG. 2B as 549A' and 549B) are visible. Note that the head 573 of coupling pin 571, and the coupling pin 571 itself (the pin coupling the two barriers 513A and 513B together in the interface region 515 and visible in FIG. 2B), could each alternatively be labeled with a suffix of A' or B because they can be considered as either the coupling pin at the right-hand side of the left barrier or the coupling pin at the left-hand side of the right barrier. It will be readily appreciated by one skilled in the art that after completion of installation of a security wall such as 507, it is advisable to protect the otherwise exposed tie-bar ends and means for coupling (and means for retaining if used) with protective covers and/or sealing means to conceal the presence of the cavities, discourage tampering, and keep out rain and snow.

Figure 2B:
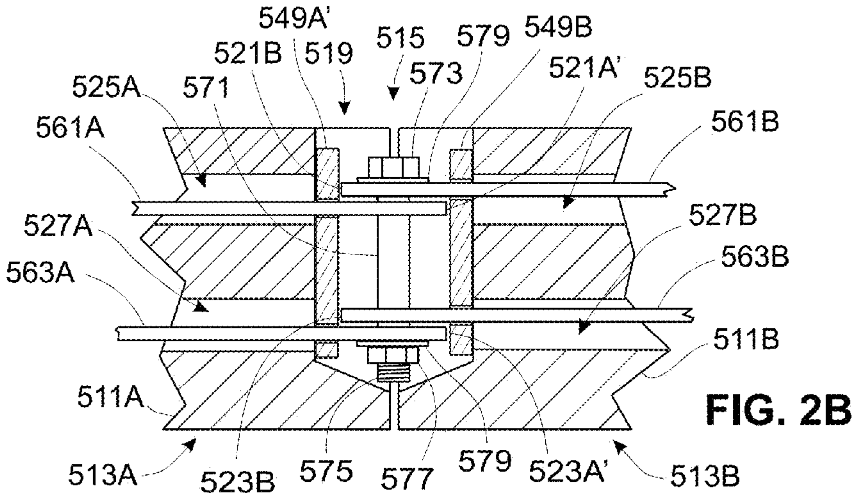
FIG. 2B shows a cross-sectional view of one embodiment of coupling devices used to secure the pair of security barrier modules, shown in FIG. 2, side-against-side to one-another.

FIG. 2B is a sectional view from FIG. 2A showing the coupling pin 571 (means for coupling) with its head 573 used to couple the two barriers 513A and 513B together sides-against-side with the tie-bars 561A and 563A of one barrier positioned end-to-end respectively with the tie-bars 561B and 563B of the other barrier. Also shown are the two retainers 549A' and 549B (both are means for retaining) located to either side of the coupling pin 571. The position of the cross-section is such as not to cut into the coupling pin 571 or head 573 or either tie-bar 561A or 563A, but does cut into the retainers 549A' and 549B and the masses of solid material 511A and 511B and their tunnels 525A, 527A, 525B and 527B. In this embodiment, the coupling pin 571 is shown with a threaded end 575 and fastened into place with washers 579 and a nut 577. One skilled in the art will readily appreciate that the relative vertical positioning of the upper tie-bars 561A and 561B relative to one another, and the relative vertical positioning of the lower tie-bars 563A and 563B relative to one another, can be in any of a variety of arrangements and not just that shown with the tie-bars 561B and 563B positioned above the tie-bars 561A and 563A. For example, two tie-bars of one barrier can be located between two tie-bars of an adjacent barrier.

In regard to FIG. 2B, for illustrative purposes only, a small gap is shown between a side of the barrier 513A and a mutually facing side of barrier 513B, in the interface region 515; but this gap in practice should be kept as small as is practical and smaller than approximately the diameter of the illustrated coupling pin 571. Preferably the two barriers 513A and 513B would be touching one another at their mutually facing sides. The purpose of keeping the gap at the interface region 515 as small as practical is to force portions of the solid material to have to be broken away from front and/or rear surfaces (surfaces such as front surface 545A of barrier 513A, and front surface 545B of barrier 513B) that include at least a portion of one of the vertical edges of one of the barriers (edges such as the vertical edge 551A' on barrier 513A, and vertical edge 551B on barrier 513B) before significant mutual rotation can occur between adjacent barriers (such as between barriers 513A and 513B).

In regard to FIG. 2B, one skilled in the art will readily recognize that the coupling pin 571 that is shown coupling both upper tie-bars 561A and 561B together, as well as coupling both lower tie-bars 563A and 563*b* together, could be replaced with a coupling arrangement involving a pin (or one or more bolts) coupling the upper tie-bars that are separate from a pin (or one or more bolts) coupling the lower tie-bars. Another embodiment could use one coupling pin to both couple the upper tie-bars and to couple the lower tie-bars, but wherein no threads or nut are used at the lower end of the coupling pin.

Figure 3:
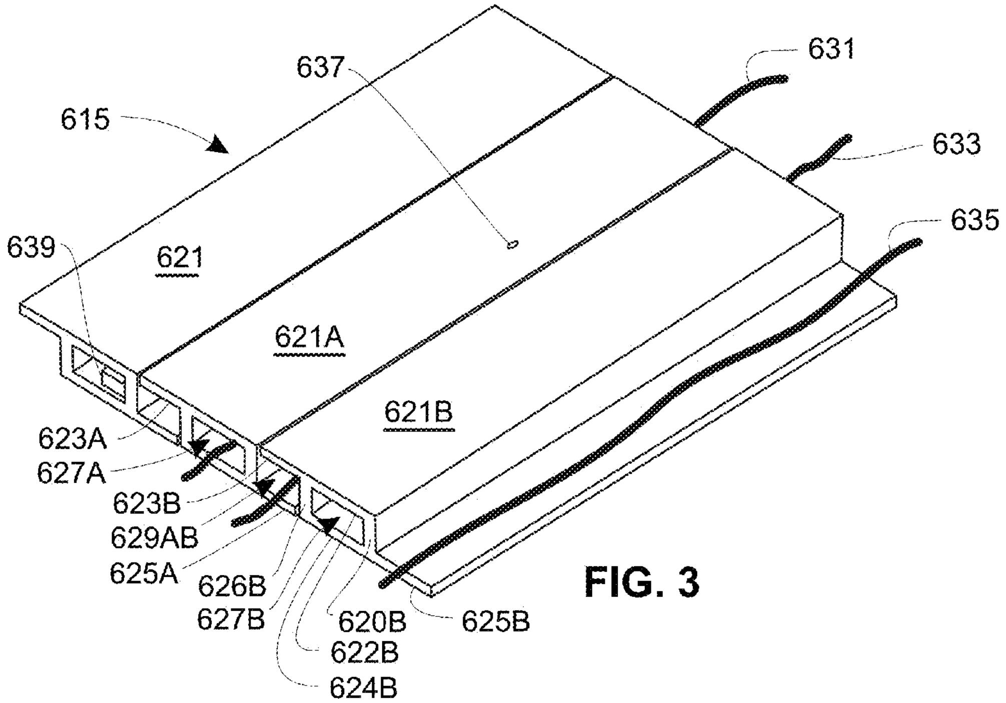
FIG. 3 shows three side-against-side armored building modules having side-lap overhangs and being used to route communications and/or power cables.

FIG. 3 shows an adjacent triplet of armored building modules 615 having side-lap overhangs and being used to route and protect communications and/or power cables. This triplet comprises third, first, and second building modules 620, 621A, 621B respectively, located side-against-side to create at least part of an armored building panel. The first building module 621A has a first overhanging flange 623A and an opposite second overhanging flange 625A as well as a channel 627A running the length of the building module 621A. (Within this disclosure, a channel is a tunnel unless it is filled with something other than a gas or liquid.) The second building module 621B has a first overhanging flange 623B and an opposite second overhanging flange 625B as well as a channel 627B running the length of the building module 621B. Placing the first and second building modules 621A, 621B adjacent and touching one-another such that the first overhanging flange 623B of the second building module 621B overhangs the second overhanging flange 625A of the first building module 621A creates a channel 629AB. The three building modules each have a similar structure as exemplified in the second building module 621B which includes first and second sides 620B,626B supporting and spacing apart an upper element 622B from a lower element 624B, and wherein the first overhanging flange 623B is an extension of the upper element 622B, and wherein the second overhanging flange 625B is an extension of the lower element 624B. Note that with such structures (621, 621A, 621B), the first building module 621A can be removed from its location between the third and second building modules 621,621B without disturbing the third or second building modules 621,621B. This is accomplished by first lifting the first building module 621A to clear flange 623A from the third building module 621, then shifting the first building module 621A away from the second building module 621B, and finally lifting the first building module 621A completely clear of both the third and second building modules 621,621B. Note also that any of the channels 627A, 627B, or 629AB can be used to route and protect cables, such as communications and/or power cables. For example, FIG. 3 shows a cable 631 routed through channel 627A in the first building module 621A, shows a cable 635 routed along a surface of overhanging flange 625B of the second building module 621B thereby placing the cable 635 substantially within the corner (i.e. within the space of a corner) established by the meeting of flange 625B with the rest of building module 625B, and shows a cable 633 routed through channel 629AB. The cables 631,633,635 may or may not each include an outer protective jacket (as described above for the jacket described in the description of FIG. 2) that provides additional armored protection to that afforded by the building modules 621A and 621B. And it should be noted that the first cable 631, second cable 633, and third cable 635 routed through the building modules 621A,621B can serve as both event sensors and as location sensors should they become damaged or severed when either of the building modules 621A,621B is damaged or destroyed by a terrorist. When a building module housing a cable becomes damaged or destroyed by an event, it is also possible, if the cable becomes damaged too, for the security system 11 to determine the location of such an event. This is because subsystems connected to the cable may become inoperative or operate improperly and will thus be indicators to the security system 11 that those subsystems are located near a region of significant disturbance and are likely the result of a security threat. Power cables, if they are routed through building modules, also serve as continuity sensors and therefore event-location sensors in the same manner as communication cables do.

One aspect of some of the embodiments of the invention is shown in FIG. 3. It is that building modules of the type shown lend themselves, by way of their channels being useful for power and communication wiring, to being instrumented with sensors such as a camera that could be installed as a fixed view camera or a pop-out camera that can be secreted or otherwise hidden within a camera portal 637 such as shown in the first building modules 621A. FIG. 3 shows an element 639 that can be a power supply, a sensor, or other equipment installed within a tunnel.

Figure 4:
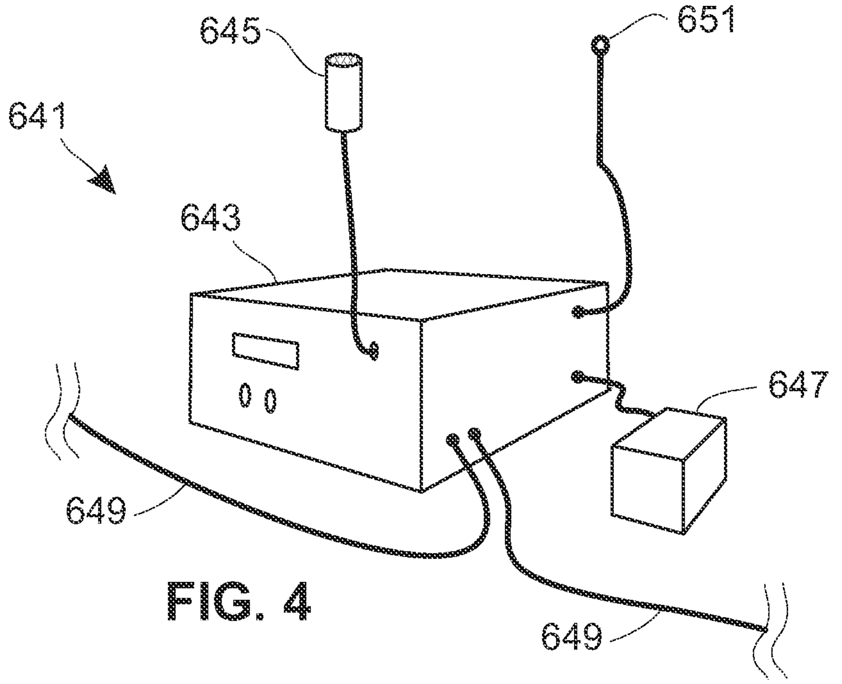
FIG. 4 shows one possible embodiment of a sensor subsystem such as could be housed within a security barrier.

FIG. 4 shows one possible embodiment of a subsystem 641 such as could be housed within a security barrier 109. A sensor unit 643 is shown having a sensor probe 645 and an antenna 651. The sensor unit 643 is connected to a power supply 647. A communication cable 649 connects into and out of the sensor unit 643 and extends beyond the view both the left and the right of the view. The sensor unit 643 is in communication with other subsystems of the armored security system 11, and this might be automatically and/or remotely selected to be by way of wireless communication using the antenna 651, or by way of communication that uses conductive wire or even wave-guides. In the case of waveguides, the cable 649 could be a fiber-optic cable, or it could represent a microwave wave-guide. FIG. 4 can also be used to illustrate a concentrator subsystem (e.g. such as concentrator subsystem 661 in FIG. 5) instead of the sensor subsystem 641, but without the attached sensor 645. The types of sensors used in various embodiments of this invention can include any that could be used to aid the detection, identification, location, or threat assessment of things and events that could threaten the security of the secure region 105. Examples include gas sensors, spectrophotometers, acoustic and/or ultrasonically based sensors (e.g. microphones), shot locators, cameras, motion detectors, Doppler sensors, radar, weight sensors, touch sensors, vibration sensors, cable-continuity sensors, optical sensors, electro-magnetic based sensors, capacitance based sensors, resistivity sensors, tension or compression sensors, contact sensors, liquid sensors, level sensors, distance sensors, position sensors, attitude sensors, elevation sensors, rotation sensors, impact sensors, humidity sensors, smoke sensors, fire sensors, heat sensors, temperature sensors, wind sensors, ambient light sensors; GPS sensors, RFID sensors, proximity sensors, trip sensors, laser or microwave beam-break sensors, voltage sensors, current sensors, power sensors, and charge sensors, to name only some. Either or both the sensor unit 643 and/or the sensor probe 645 can include a signal processor. Use of GPS information and the reading of RFID tags by an RFID sensor can of course be used to track and monitor for unexpected situations and movements of known personnel and of assets such as barrier blocks or any components and subsystems of the security system 11 and what it is protecting. Terrestrial triangulation sensors can also be used in addition to GPS sensors, or instead of GPS sensors. If a sensor system (or networked group of sensor subsystems) is deemed failing it can be masked out to avoid its causing false alarms. A sensor subsystem can be put in various modes discreetly. Example modes include repair mode, maintenance mode, test mode, off-line mode, and active mode. In other than active mode, a sensor would not report measurements as real and would not effect (i.e. not make happen) real alarms. When a sensor is put into test mode, engineers can perform end to end testing, and they can enable such a sensor to be marked on a GIS (geographical information system display) that they are in test mode. When a sensor is put into off-line mode, it is caused to be ignored by the rest of the security system 11 entirely. In active mode, a sensor subsystem is deemed to be in proper working order, have passed routine automated or manual validation tests, and will pass alarms and properly interact with active countermeasures in the rest of the security system 11.

Figure 5:
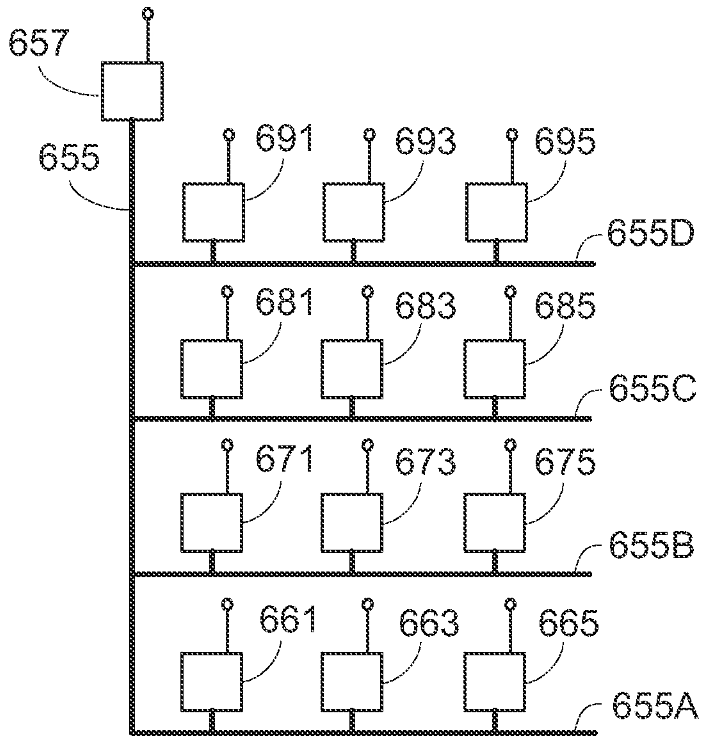
FIG. 5 shows multiple subsystems interconnected by a network.

FIG. 5 shows multiple subsystems interconnected (i.e. in communication with one another) by a network comprising branches off of a main shared branch 655. Sensor subsystems 661, 663, and 665 connect to and share a first branch 655A of the network. Concentrator subsystems 671, 673, and 675 connect to and share a second branch 655B. Monitor and Control subsystems 681, 683, and 685 connect to and share a third branch 655C. And alarm subsystems 691, 693, and 695 connect to and share a fourth branch 655D. The four branches 655A-D each connect to and share a main branch 655 which is also in communication with (and shared with) other systems or subsystem(s) 657 such as a Network Operations Center (NOC) or even a Tactical Control Center (TOC). Each of the systems (or subsystems) is shown with its own antenna for use in a wireless communication network.

Figure 6:
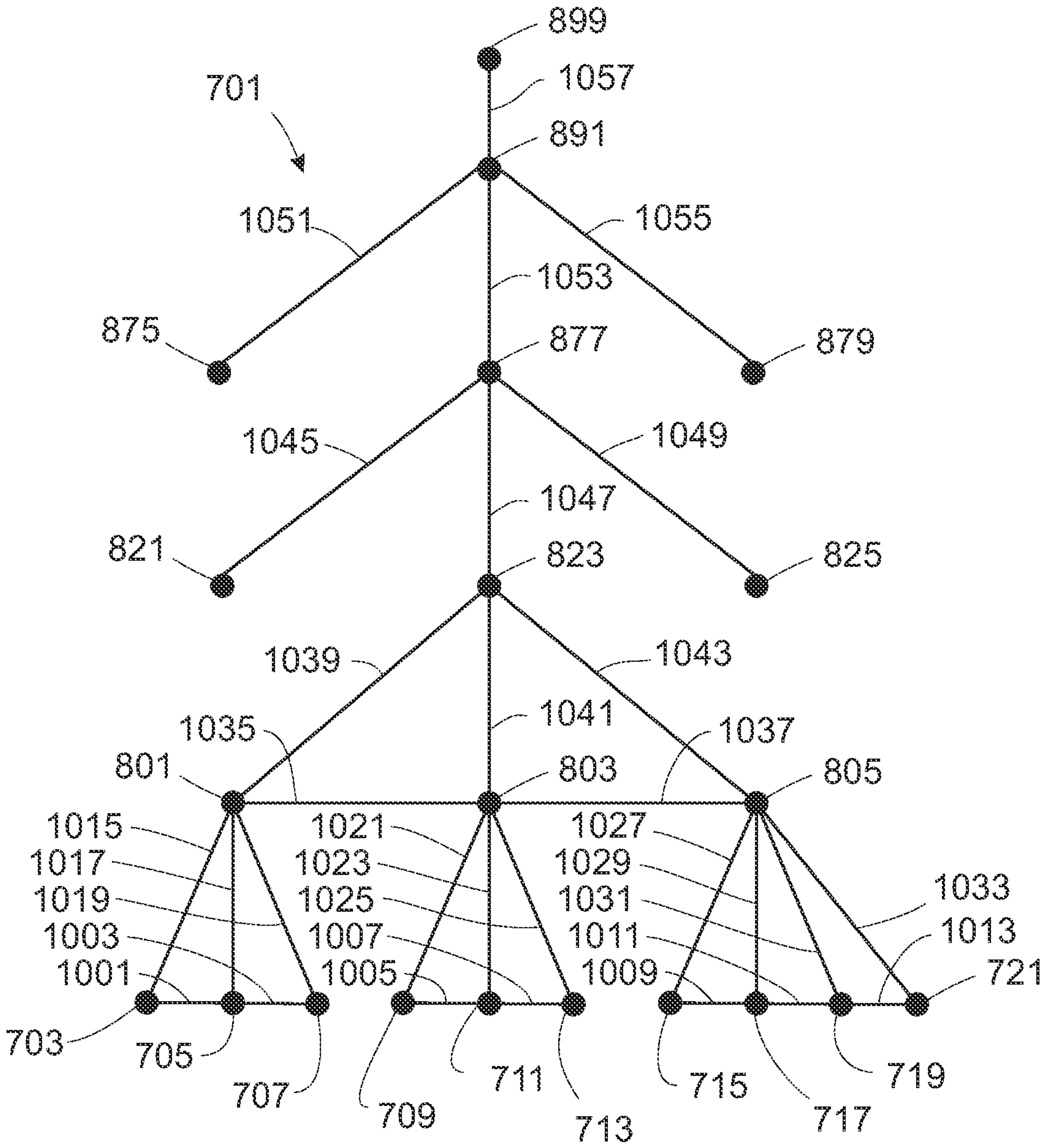
FIG. 6 shows a hierarchical network of interconnected sensors, signal concentrators, a security monitor and control subsystem, and alarms.

FIG. 6 shows a hierarchical communication network 701 of interconnected sensor subsystems, signal concentrator subsystems, a security monitor and control subsystem, and an alarm subsystem, whereby all subsystems are able to communicate with one-another by way of the network 701. Sensor subsystems 703, 705, and 707 are interconnected with sensor-to-sensor links 1001 and 1003, and they also connect to first-level concentrator subsystems 801 by means of sensor-to-concentrator links 1015, 1017, and 1019 respectively. Sensor subsystems 709, 711, and 713 are interconnected with sensor-to-sensor links 1005 and 1007, and they also connect to first-level concentrator subsystems 801 by means of sensor-to-concentrator links 1015, 1017, and 1019 respectively. Sensor subsystems 715, 717, 719, and 721 are interconnected with sensor-to-sensor links 1009, 1011, and 1013, and they also connect to first-level concentrator subsystems 805 by means of sensor-to-concentrator links 1027, 1029, 1031, and 1033 respectively. First-level linked concentrator subsystems 801, 803, and 805 are interconnected by concentrator-to-concentrator links 1035 and 1037, and they also connect to second-level concentrator subsystem 823 by means of first-level-concentrator-to-second-level-concentrator links 1039, 1041, and 1043 respectively. Second-level concentrator subsystems 821 and 825 may have links to other first-level-concentrator subsystems which may have links to other sensor subsystems. Third-level concentrator subsystem 877 connects to second-level concentrator subsystems 821, 823, and 825 by means of second-level-concentrator-to-third-level concentrator links 1045, 1047, and 1049 respectively. Monitor and control subsystem 891 connects to third-level concentrator 877 by means of link 1053, but may also connect to other third-level concentrators such as 875 and 879 by means of links 1051 and 1055 respectively. Third-level concentrators 875 and 879 may have a hierarchical network below them much as does third-level concentrator 877. Such networks may connect hundreds of sensors to the monitor and control subsystem 891, and they may have fewer or more concentrator levels as shown in this figure. Ultimately, the monitor and control subsystem 891 connects via a link 1057 to other subsystems such as an alarm subsystem 899. The interconnections shown can be by fixed hard-wiring or by fixed wireless channel assignments, or they can be logical and variable through either fixed or dynamic programming.

Figure 7:
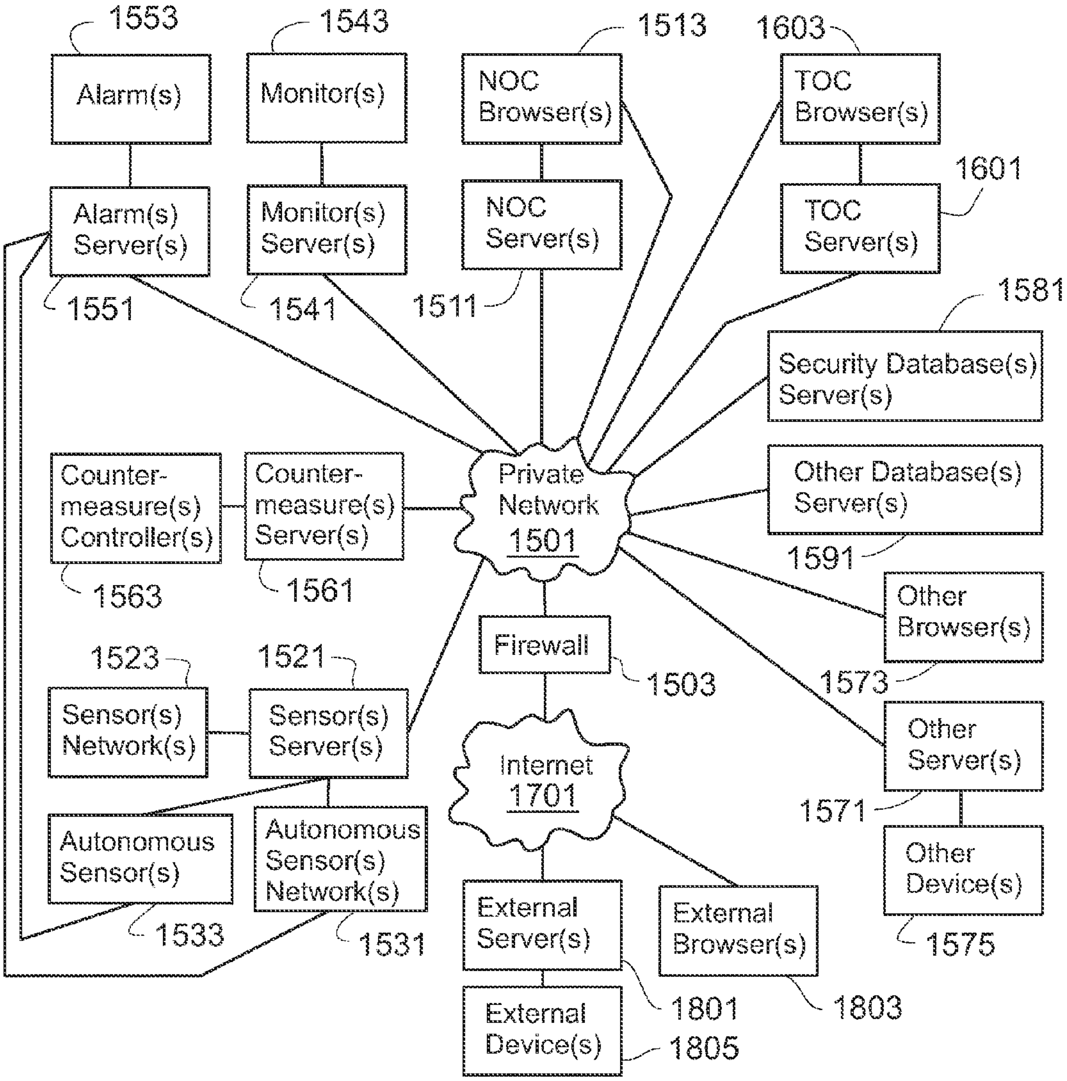
FIG. 7 shows a high-level view of security components networked by a private intranet connected to the Internet via a firewall.

FIG. 7 shows a high-level view of security components networked together by a private intranet connected to the Internet via a firewall. In this disclosure, each of the rectangles (i.e. each "box") shown in FIG. 7 is to be considered a "component" of the armored security system 11, as is each group member of a box if that box comprises a group of components. Each of the lines that are shown interconnecting components represents one or more communication links between the components found at the two ends of that line. Any two member components of a group of components may also be interconnected by way of one or more communication links. The sensor network(s) 1523, in particular, may comprise multiple sensors interlinked communicatively to form one or more networks. FIG. 6 depicts a portion of one possible network of sensors linked into a hierarchy network of concentrators. Each of the components comprises one or more "subsystems".

FIG. 7 also shows that various servers and browsers (and other computers and computer-controlled apparatuses and devices) are connected to a private network 1501 operating as an intranet. The private network 1501 is connected to the Intranet 1701 by way of a firewall 1503. The Internet 1701 is of course connected to various external servers 1801 and external browsers 1803, all external to the private intranet 1501. Some of the external servers 1801 are connected to external devices 1805. Connected to the private network 1501 are one or more sensor servers 1521, one or more monitor and control servers 1541, one or more alarm servers 1551, one or more countermeasure servers 1561, one or more Network Operation Center (NOC) servers 1511, one or more Tactical Operations Center (TOC) servers 1601, one or more security database servers 1581, one or more other database servers 1591, and one or more other servers 1571. Also connected within the private network 1501 are one or more NOC browsers 1513 (which may also be connected directly to one or more NOC servers 1511), one or more TOC browsers 1603 (which may also be connected directly to one or more TOC servers 1601), and one or more other browsers 1573. One or more other devices 1575 may be connected to the one or more other servers 1571. One or more monitor and control subsystem(s) are connected to the one or more monitor and control servers 1541. One or more alarms 1553 are connected to the one or more alarm servers 1551. One or more countermeasure controllers 1563 are connected to the one or more countermeasure servers 1561. One or more sensor networks 1523 are connected to the one or more Sensor Servers 1521. One or more autonomous sensors 1533 and/or one or more autonomous sensor networks 1531 may also be connected to the one or more sensor servers 1521. Any of the one or more autonomous sensors 1533 and any of the one or more autonomous sensor networks 1531 may be connected directly to the one or more alarm servers 1551.

An individual one of the one or more sensor networks 1523 may comprise concentrators such as first concentrator subsystem 671 shown in FIG. 5 or first first-level linked concentrator 801 shown in FIG. 6 used for converging data and information from many sensors into integrated data and/or information for transmission to one of more of the sensor servers 1521.

An individual one of the one or more autonomous sensors 1533 may be called "autonomous" for any of at least three reasons. It may be self-powered by an associated power source such as by a battery and/or solar cells or by one or more power-generating device(s) such as those that derive power from a piezoelectric transducer, a thermoelectric transducer, a fuel-cell, or a device that converts ambient electro-magnetic waves into voltage and current. It may be linked without the private network 1501 to one or more alarm servers 1551 and able to use such a link when sensor servers 1521 (or a concentrator such as 801 in FIG. 6) are not functioning properly. And/or it may include sufficient means to judge when to communicate data and/or information derived from the data. Autonomous sensor networks 1531 can be either networks of autonomous sensors or networks that each collectively has any of the attributes that make an individual sensor autonomous. At least some of the subsystems in embodiments of the invention can work autonomously as a federated group. An example of a federated group would be a group of subsystems that have at least temporarily been cut off from communications with any monitor and control subsystem but are able to recognize that situation and work together to continue their functions and to archive data and information they generate so that it can be later transmitted to a higher-level system (such as a monitor and control subsystem) when it is reconnected. Not all of the subsystems need to be fully on all of the time as some are not first-warning devices, so they can hibernate some of the time. Subsystems in hibernation can be awakened by internal watch-dog timers, or by signals received through a communication interface that remains awake during the hibernation of the rest of the subsystem. Also, with low-level analysis, not all of the sensor data need be transferred to higher-level subsystems.

The one or more monitor and control subsystems 1543 use information obtained through the one or more monitor and control servers 1541 from the one or more sensor servers 1521, and they use programmed logic and rules to decide when to activate one or more of the alarms 1553 via one or more of the alarm servers 1551 via the private network 1501.

The one or more NOC browsers 1513 permit user configuration and supervision of the private network 1501 and any of its networked components, some even of which may lie external to the private network 1501 and accessible via the firewall 1503 and the Internet 1701, but not including any of the TOC browsers 1603 or TOC servers 1601. The one or more NOC browsers 1513 may have both a direct link to the one or more NOC servers 1511 as well as a link directly to the private network 1501; this is to enable user control of the NOC servers 1511 even when the private network 1501 is not fully functioning. Under one mode of the invention, user control by way of the NOC browsers 1513 and/or the NOC servers 1511 is provided of sensors in the sensor networks 1523, the sensor networks 1523 themselves, sensor servers 1521, autonomous sensors 1533, autonomous sensor networks 1531, concentrators (such as 671 in FIGS. 5 and 801 in FIG. 6), alarms 1553, alarm servers 1551, monitor and control subsystems 1543, monitor and control servers 1541, countermeasure controllers 1563, countermeasure servers 1561, security database servers 1581, other database servers 1591, other browsers 1573, other servers 1571, other devices 1573, and even some of the external devices 1805.

The one or more TOC browsers 1603 permit user configuration and supervision of the one or more TOC servers 1601, and a direct link to the one or more TOC servers 1601 enables user control of the TOC servers 1601 even when the private network 1501 is not fully functioning. The one or more TOC browsers 1503 and the one or more NOC browsers 1513 enable human communications between the NOC and the TOC. The one or more TOC browsers 1503 also enable access to supervise and even control the one or more countermeasure controllers 1563 by way of the one or more countermeasure servers 1561, under conditions that would require overriding the NOC.

One aspect of the invention is to provide in its embodiments means to assure that subsystems are all synchronized to the same clock-time. The one or more NOC servers 1511 would each include their own clock as a master reference and would keep their respective clocks synchronized to one another. Each NOC server 1511 can use the Internet, when it is available, to synchronize its own clock to a reliable standard. The one or more NOC servers 1511 can also use NTP (network time protocol) and/or other methods to enable sensor data and recorded information to be accurately time-stamped with times that are synchronized to the master clock of the controlling NOC. This enables accurate time records to be associated with recorded data and information useful, for example, in forensic evaluation, such as when the presence of a noxious gas was detected or when high vibrations by certain barrier modules were experienced. GPS typically provides time stamps, but these time-stamps, if recorded, would be flagged as "suspect event time". The controlling NOC in some implementations constantly looks at all subsystems generating time data to assure that their respective clocks are synchronized to the clock of the controlling NOC, and resets them (i.e. "slams" them) as needed. If a subsystem wakes up or restarts its clock, any data and information it generates before the controlling NOC can slam it, would be flagged with "suspect time", "no time sync verification", or an equivalent flag.

One aspect of the invention is to provide in some of its embodiments one or more duplicated components and/or subsystems which can be activated to provide redundancy and/or backup capabilities. Sufficient automatic control programs and/or alternate human intervention, by way of the NOC browsers 1513 and TOC browsers 1603, would be included to switch over from the use of a failed or failing component to a duplicate one that is working. This implies that constant checks are made by the NOC servers 1511, the TOC servers 1601, the monitor and control servers 1541, the alarm servers 1551, the countermeasure servers 1561, the sensor servers 1521, the autonomous networks 1531, the autonomous sensors 1533, the other servers 1571, the security database servers 1581, and the other database servers that their duplicates and connected subsystems are functioning properly or ready to function properly when needed. One aspect of the invention is that subsystems within a group of similar subsystems are made capable of taking over the duties of any of any inoperable or dysfunctional member of the group; this taking over of extra duty can be made to commence or cease by way of commands from a higher-level subsystem (e.g. a monitor and control subsystem, a network operations center subsystem, and/or a tactical operations center subsystem). It can also be made to commence or cease by way of a subsystem checking on the health of other subsystems, and when recognizing another subsystem is inoperable or dysfunctional (i.e. unhealthy), to take over duties that back-up or cover for the unhealthy subsystem. An example of this would be a camera aiming toward a location of an inoperable microphone to ascertain whether there is noticeable any unusual activity going on at that location.

Security databases servers 1581 along with their attached memory devices (not shown) maintain records of the configuration parameters and settings of the armored security system 11, as well as of historical and current information about system status and sensor information, updated and/or archived routinely at regular intervals as well as asynchronously when event driven. Duplicate security databases 1581 are maintained with copies of the stored information for backup purposes in each member security database. The duplicate members of the security databases 1581 may be located in different geographical locations for security purposes, one of which may be the location 103 of a centralized monitor and control subsystem. Historical data and event records are kept not only as potential evidence for later use in proving those data and events, but also for engineering use to analyze for in improving the responsiveness an accuracy of the automated functions within the security system 11.

Other database servers 1591 along with their attached memory devices (not shown) maintain records managed by the Tactical Operations Center and/or a site facilities team. Duplicates of the other databases 1591 are maintained with copies of the stored information for backup purposes in each member security database. The duplicate members of the security databases 1591 may be located in different geographical locations for security purposes.

Other browsers 1573, other servers 1571, and other devices 1575 that are connected to the other servers 1571 might for example be used by a site maintenance team to monitor and control facilities sensors and equipment, even those not having to do with security. Data and configurations important to those activities are stored in the other database servers 1591 where they can also be accessed by the personnel and systems of the NOC and the TOC.

External browsers 1803, external servers 1801, and external devices 1805, all situated outside the private network 1501 and made available to the private network 1501 by way of the Internet 1701 and its connection to the private network 1501 by way of a firewall 1503 may be used to extend the reach of the armored security system to locations both in the secure area 105 and the unsecure area 107. The external devices 1805 may include networks of sensors, individual sensors, autonomous sensors, as well as devices such as cell-phones, personal digital assistants, personal computers, or personal appliances.

Another aspect of the invention is that any of the communications connections between component groups, between members of the component groups, and between subsystems within members of the component groups of the armored security system 11 may comprise serial and/or parallel path segments each of which may be provisioned with a different communications medium, a different communication technology, or in some cases even a different service provider. This particularly includes connections shown in FIG. 7 as outside the private network 1501 portion that is represented as a cloud, but also those not shown in FIG. 7 but within the private network 1501 portion that is represented as a cloud. The use of parallel paths (e.g. redundant paths) using different media results in overlapping networks (i.e. networks with logically-overlapping, redundant, paths) and adds much to the robustness of the security system. Examples of various communications media include airwaves, fiber-optics, and conductive wire or cables. Fiber-optics and conductive wire or cables are examples of “wired” communications media that are referred to herein as “guiding media”, whereas airwaves are used for wireless communications. Examples of various communications link technologies include dedicated lines, shared lines, automatically switched lines, satellite links, telephone communication, cell-phone communication, wireless networking, short-range wireless communication, long-range wireless communication, medium-range wireless communication, laser-beam communication, acoustic communication, ultrasound communication, long-wave communication, short-wave communication, microwave communication, millimeter-wave communication, broadcast communication, and power-line communication. Some of these communication link technologies may provide multiple channels. Examples of various communications technology attributes include analog modulations, pulse modulations, digital modulations, synchronous clocking, asynchronous clocking, handshaking, packet switching, CDMA, TDMA, FDMA, error detection and/or correction methods, physical and electrical interfacing standards, encryption, and methods of secure identification of sender and/or recipient.

Another aspect of the invention is that any of the messaging accomplished over the connections between component groups, between members of the component groups, and between subsystems within members of the component groups of the armored security system 11 may be by way of dynamically changed paths, channels, and/or other communications technologies including communications link technologies and communications technology attributes. This particularly includes connections shown in FIG. 7 as outside the private network 1501 portion that is represented as a cloud, but also those not shown in FIG. 7 but within the private network 1501 portion that is represented as a cloud. The switching between various selected channels, paths, and/or other provisioned communications technology may be made according to systematic rules or selected randomly among those provisioned. For example packet communication could include and use within a packet header notification with information regarding which channel, path, or other communications technology attributes will be used for the next packet. Duplicated versions of a message may be sent using distinctly different channels, paths, and/or communications technology attributes, and the received versions with the most matches at a common destination could be accepted as best representing the original message. Or a message with no match at a common destination could be resent using different selections of paths, channels, and/or communications technology attributes until redundantly transmitted and received messages match. These techniques amount to what may be referred to in this disclosure as "diversity messaging" (or "diversity signaling"), diverse in paths, channels, and/or communication technology attributes. Combination of diversity messaging with dynamic changes of channels, paths, and/or communications technology attributes may be referred to in this disclosure as "dynamic diversity messaging" (or "dynamic diversity signaling"). Communications of finite duration from a computerized sensor to a computer in another subsystem can be made to begin at pseudo-randomly chosen times, and these may be known in advance by both the computerized sensor and that other computer. And switching from one communications medium to another communications medium may occur at times known in advance by both a sender and a receiver using those media. Some of the motivations for using diversity messaging (or dynamic diversity messaging) in communication include: a) reducing the possibility of an interruption in communication caused by terrorist activities, b) increasing the difficulty of preventing messaging and signals from reaching their intended targets correctly, c) providing alternative choices for a connection when conditions may degrade some choices but not others, d) enable continued communications when some communication choices are unavailable due to maintenance activities, and e) enable message comparisons between redundant connections to detect and correct communication errors which simple parity checks can not accomplish. When some communication paths become inoperable, others that remain operable can maintain needed communications. As is described in the next paragraph, provisioned communications paths, channels, and/or communications technology attributes not being used for needed communications can be used in the meantime to carry misinformation in order to confuse eavesdroppers.

Figure 8:
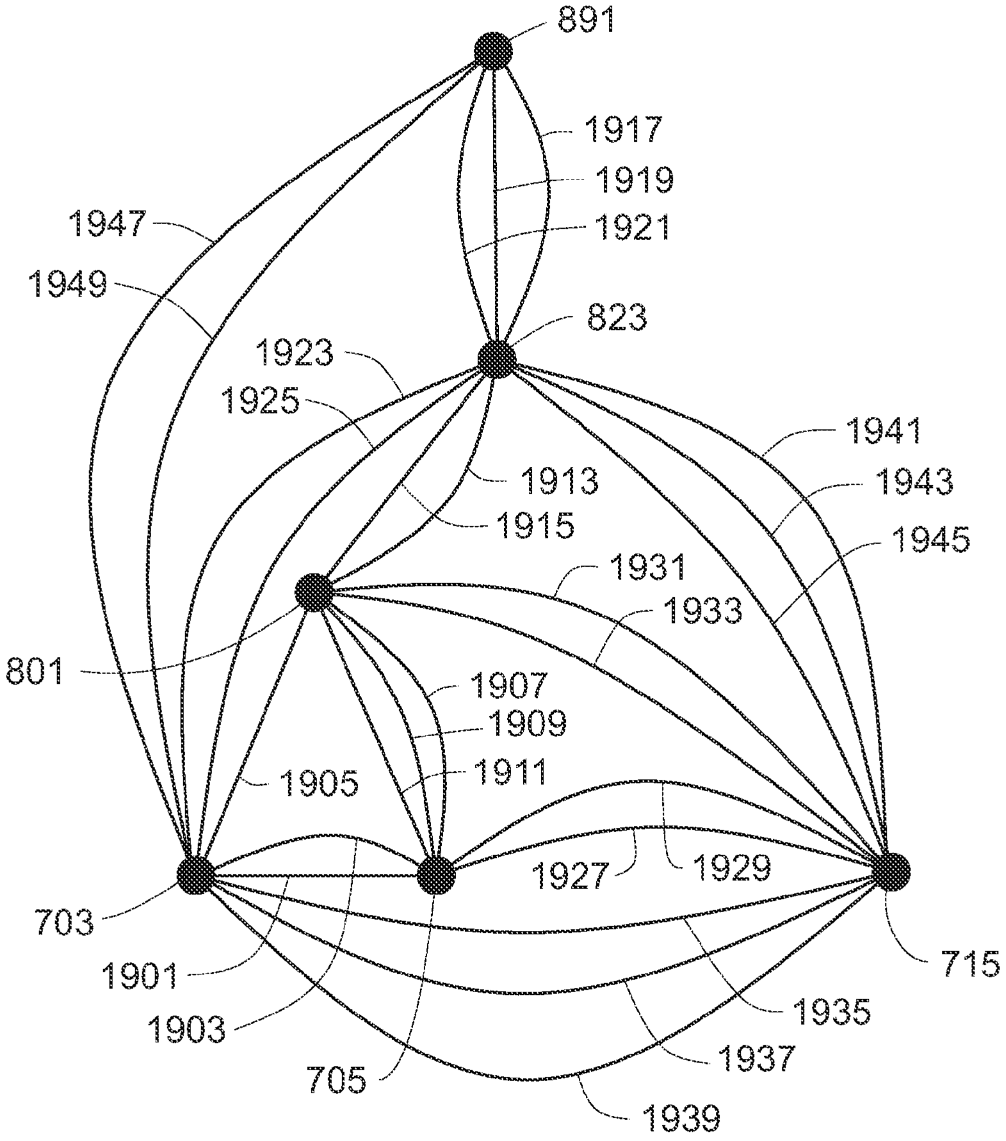
FIG. 8 shows an example of multiply diverse communication connections between a small set of subsystems.

FIG. 8 shows an example of multiply diverse communication connections between a small set of subsystems. The subsystems include three sensor subsystems 703, 705, and 715 along with two concentrators 801,823 and a monitor and control subsystem 891 creating a hierarchical structure somewhat similar to that shown in FIG. 6. Communication connections which might otherwise have been shown as a single line drawn between any two of these subsystems are instead drawn here as multiple lines each indicating an available communication medium, path, and communication technology for use in carrying data, information, and/or other messages from one subsystem at one end of the line to the subsystem at the opposite end of the line. In this drawing, the communication connections comprise the following: balanced twisted pair 1901, 1905, 1911, 1915, and 1935 through tunnels within concrete barrier modules; Ethernet on Cat-5 cable 1903, 1909, 1929, and 1937 through tunnels within concrete barrier modules; short-range wireless 1907, 1927, and 1939; fiber-optic cable 1913, 1925, 1933, and 1943 through tunnels within concrete barrier modules; fiber-optic cable 1917 and 1949 NOT through tunnels within concrete barrier modules; satellite link 1921; and cellular phone link 1945. The other communications connections 1919, 1923, 1931, and 1947 can be additional ones of these previous combinations of available communication media, paths, and communication technologies. Not illustrated in the drawing, but implicit in the use of diversity messaging in this invention, is the choice within some transmission technologies of choosing channels such as among available frequencies, time slots, and/or CDMA codes. Communication paths and channels that are not being used at any one time can be used to transmit misinformation so as to fool any eavesdropper(s), or even to provide information that would help to entrap such eavesdropper(s). With coordination and/or secure identification of messages containing real information (i.e. information that is not misinformation), communications of real information and misinformation can be interleaved on any given path or channel available to the armored security system.

Figure 9:
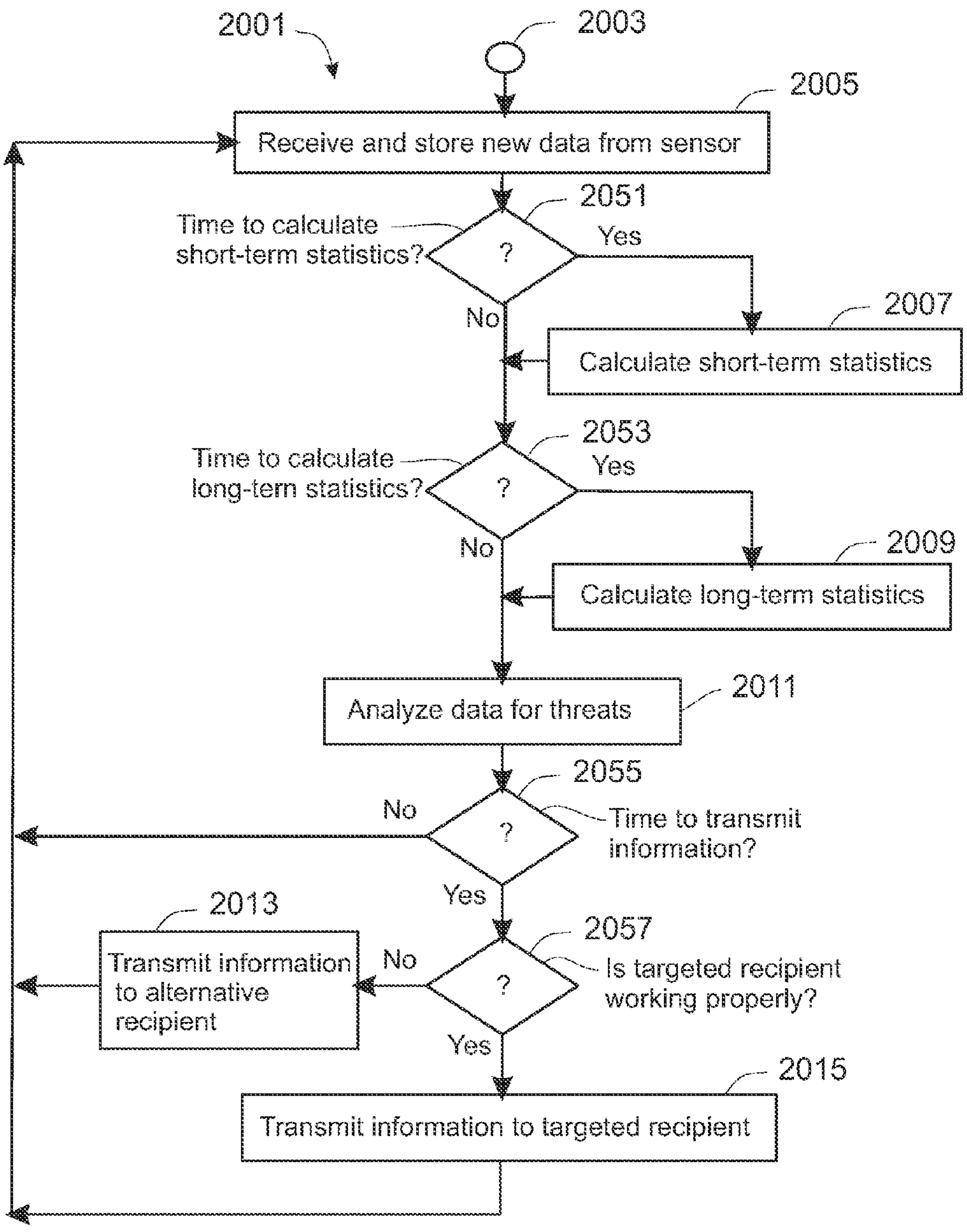
FIG. 9 shows a method of collecting sensor data, analyzing the data for information, and communicating information to a working concentrator subsystem.

FIG. 9 shows a flow chart of a method of sensor data collection 2001 used by a sensor subsystem to receive and store 2005 new data from its sensor device, to analyze 2011 the data for information, and to communicate (i.e. transmit 2013, 2015) information to a working targeted recipient or an alternate target. The method 2001 would be carried out by a processor executing a stored program (stored on a computer readable medium) and in communication with at least one sensor unit (e.g. the sensor unit 643 shown in FIG. 4, the sensor subsystem 661 shown in FIG. 5, or the sensor subsystem 703 in FIG. 6) and with a targeted receiver of sensor information such as another sensor (e.g. the sensor subsystem 663 shown in FIG. 5 or the sensor subsystem 705 in FIG. 6), a concentrator (e.g. the concentrator 671 in FIG. 5, or 801 in FIG. 6), or a monitor and control system (e.g. the monitor and control subsystem 1543 in FIG. 7, 891 in FIG. 6, or 681 in FIG. 5). The processor and stored program might be part of a sensor unit (i.e. sensor subsystem). Following a start 2003 of the method 2001, data from at least one sensor (e.g. the sensor unit 643 in FIG. 4) would be received and stored 2005. Part of the receive and store step 2005 might include changing the rate at which sensor data is acquired, as for example when a threat has been detected and a higher rate for more information is desirable, a lower rate for energy conservation, a lower data-rate for bandwidth conservation, or greater stealth is desirable. It also might include a decision to archive data in the data storage memory 5007 when it may be called upon for forensic purposes or for evidence following a terrorist incident that might have cut-off the sensor subsystem from the rest of the security system. Such archived data, archived on a local basis, can enable uploads of the data on an as-required basis by higher-level subsystems. A first test 2051 would be made to check whether it is time to calculate short-term statistics 2007, and if so to do so. If it is not time to calculate short-term statistics, or if such statistics have just been calculated, then a second test 2053 would be made to check whether it is time to calculate long-term statistics 2009, and if so to do so. If it is not time to calculate long-term statistics, or if such statistics have just been calculated, then the stored data (including real data and/or any recently calculated statistics are analyzed 2011 for indications that there may be a threat indicated in the data or its statistics. This analysis 2011 may include trend analysis to discover meaningful deviations from expected norms, and it may include looking for unexpected deviations or deviations having a low probability of expectation. After this analysis is made, a third test 2055 would be made to check whether it is advisable to communicate (e.g. transmit) discovery of meaningful deviations in the sensor data and/or statistics to a concentrator of sensor information, and if not to return to step 2005 to receive and store more new data. Meaningful deviations could be anything outside of expected limits, for example two-sigma statistical limits about a mean of purely random behavior. The test 2055 would also check the priority of the sensor's information compared to that of other sensors attempting to utilize the same communication bandwidth(s), because priorities can change, and would give communications priority to those other sensors when they have a higher priority. And if an advisory is under effect from a higher-level subsystem or NOC to reduce bandwidth utilization, as when under a heightened terrorist alert, the test 2055 may use a rule to decide upon the frequency of information reporting. If it is time to transmit the data and/or statistics, then a fourth test 2057 is made to check whether a preferred concentrator subsystem is working properly 2015, and if so to do so. Such a preferred concentrator subsystem is normally one that is at a next higher level in a hierarchy of data and information collection, the hierarchy starting with sensor subsystems at the lowest level, followed by concentrator subsystems at one or more higher level(s), and reaching to a monitor and control subsystem at an even higher level. If the preferred (i.e. targeted) higher-level subsystem is not working properly, then the data and/or information is transmitted 2013 instead to an alternative recipient. However, as disclosed farther below the preferred or targeted recipient, under conditions of a detected or possible threat, or of a detected or otherwise known inability to operate properly, may be made another sensor, a different concentrator, or a different monitor and control subsystem.

Figure 10:
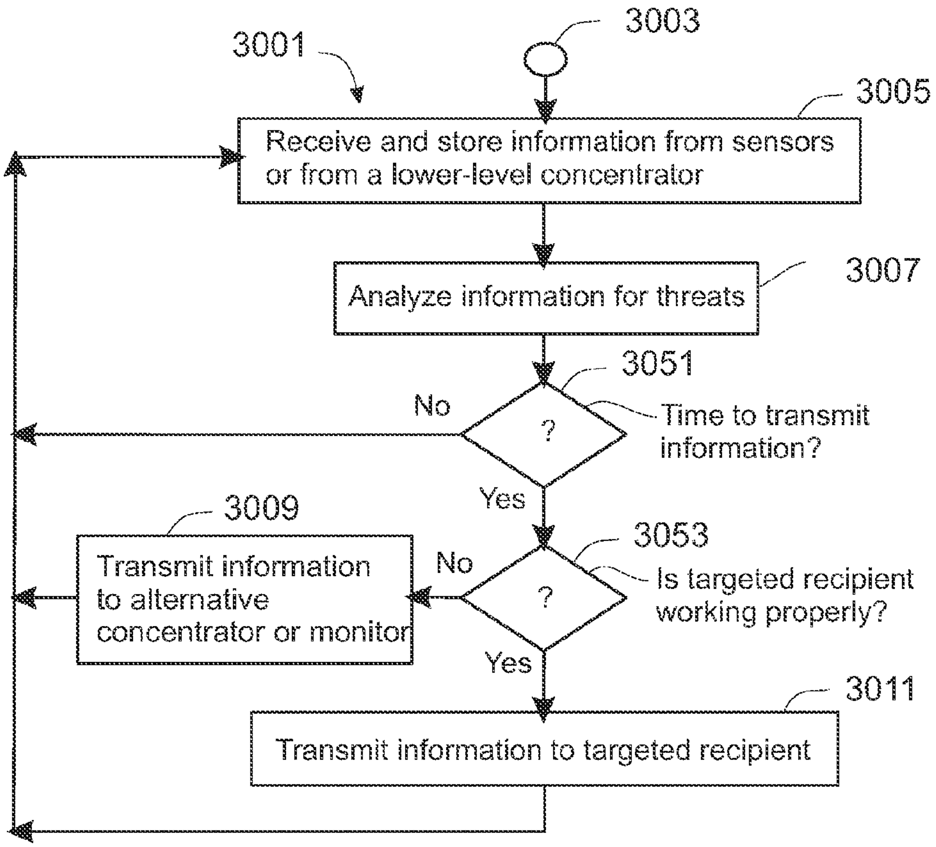
FIG. 10 shows a method used by a concentrator to receive information and data from sensors, analyzing the information and data collectively for threat information, and communicating that threat information to another working concentrator or to a monitoring and control subsystem.

FIG. 10 shows a flowchart of a method 3001 used by a concentrator subsystem to receive 3005 information and data from sensor subsystems, to analyze 3007 the information and data collectively for threat information, and to communicate 3009,3011 that threat information to another working concentrator subsystem or to a monitor and control subsystem. The method 3001 would be carried out by a processor executing a stored program (stored on a computer readable medium) and in communication with at least one sensor unit (e.g. the sensor unit 643 shown in FIG. 4, the sensor subsystem 661 shown in FIG. 5, or the sensor subsystem 703 in FIG. 6), and with at least a monitor and control system (e.g. the monitor and control subsystem 1543 in FIG. 7, 891 in FIG. 6, or 681 in FIG. 5) or another concentrator subsystem (e.g. the concentrator subsystem 673 shown in FIG. 5 or the concentrator subsystem 823 in FIG. 6). The processor and stored program might be part of a concentrator subsystem. Following a start 3003 of the method 3001, information from one or more sensors (e.g. the sensor unit 643 in FIG. 4, the sensor subsystems 661,663,665 shown in FIG. 5, or the sensor subsystems 703,705,707 in FIG. 6) or from one or more concentrator subsystems (e.g. in FIG. 6, concentrator 823 could receive from concentrators 801,803,805) would be received and stored 3005. Following the receipt of that information, it would be analyzed 3007 for threats. Concentrators have an advantage over single sensor subsystems in that they can analyze sensor information received from more than a single sensor, and can thereby inspect for trends and unexpected behaviors with a greater sensitivity for detecting actual threats as well as a greater ability to infer new information. For example, if a concentrator detects that multiple sensors in a given physical location are all revealing unexpected behavior, it becomes more probable that there is a real cause to that behavior, and may also infer that the threat is affecting more than a single location. Also for example, if a succession of sensors separated distances from one another reveals a succession of unexpected behavior displaced in time differently from one another, that data may be analyzed to reveal a direction and speed of movement of a threat, be it movement of an object or a cloud of gas. After this analysis is made, a first test 3051 would be made to check whether it is advisable to communicate discovery of meaningful analysis results to another concentrator subsystem or monitor and control subsystem, and if not to return to step 3005 to receive and store more new information. Meaningful deviations could be anything outside of expected limits, for example two-sigma statistical limits about a mean of purely random behavior. The test 3051 would also check the priority of the sensor's information compared to that of other sensors attempting to utilize the same communication bandwidth(s), because priorities can change, and would give communications priority to those other sensors when they have a higher priority. And if an advisory is under effect from a higher-level subsystem or NOC to reduce bandwidth utilization, as when under a heightened terrorist alert, the test 3051 may use a rule to decide upon the frequency of information reporting. If it is time to transmit the analysis results, then a second test 3053 is made to check 3053 whether a preferred targeted recipient (e.g. a concentrator subsystem at a higher level) is working properly, and if so to transmit 3011 the information to the targeted recipient. Such a preferred concentrator subsystem is normally one that is at a next higher level in a hierarchy of data and information collection starting just above sensor subsystems at the lowest level, to concentrator subsystems at one or more higher level(s), and reaching to a monitor and control subsystem at an even higher level. If the preferred concentrator subsystem or monitor-and-control system is not working properly, then the analysis results are transmitted 3009 instead to an alternative concentrator subsystem or monitor and control subsystem. The alternative concentrator subsystem could be at the same level in a hierarchy. However, as disclosed farther below the preferred or targeted recipient, under conditions of a detected or possible threat, or of a detected or otherwise known inability to operate properly, may be made a different concentrator or a different monitor and control subsystem.

Figure 11:
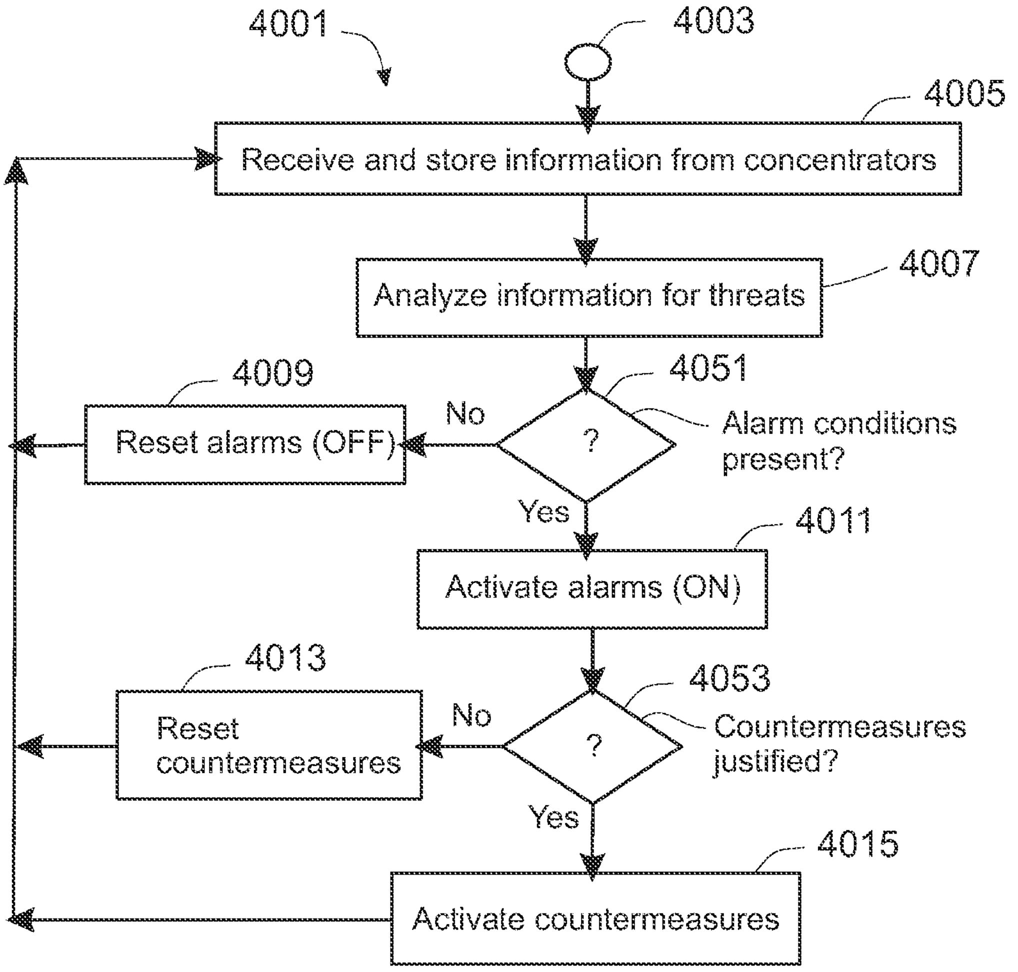
FIG. 11 shows a method used by a monitoring and control subsystem to receive information from concentrators, to analyze that information for threats, to control alarms, and to take countermeasures.

FIG. 11 shows a flow chart of a method 4001 used by a monitor and control subsystem to receive information from concentrator subsystems, to analyze that information for threats, to control alarms, and to take countermeasures. The method 4001 would be carried out by a processor executing a stored program (stored on a computer readable medium) and in communication with at least one sensor unit (e.g. the sensor unit 643 shown in FIG. 4, the sensor subsystem 661 shown in FIG. 5, or the sensor subsystem 703 in FIG. 6) by way of zero or more concentrator subsystems (e.g. the concentrator subsystem 671 shown in FIG. 5 or the concentrator subsystem 823 in FIG. 6), and with at least a monitor and control system (e.g. the monitor and control subsystem 1543 in FIG. 7, 891 in FIG. 6, or 681 in FIG. 5). The processor and stored program might be part of the monitor and control subsystem. Following a start 4003 of the method 4001, information from at least one sensor (e.g. the sensor unit 643 in FIG. 4, the sensor subsystem 661 shown in FIG. 5, or the sensor subsystem 703 in FIG. 6) or from at least one concentrator subsystem would be received and stored 4005. Following the receipt of that information, it would be analyzed 4007 for threats. After this analysis is made, a first test 4051 would be made to check whether alarm conditions are present in the information, and if not to reset alarms and return to step 4005 to receive and store more new information. If alarm conditions are met, then alarms are activated (ON) 4011, after which a second test 4053 is made to check whether countermeasures are justified, and if so to activate the appropriate countermeasures 4015 and return to step 4005 to receive and store more new information, or if not to reset (turn OFF) 4013 the countermeasure(s). Typically countermeasures would be taken by one or more subsystems which have the capability to control themselves once activated to ON, and can turn themselves off once the threat condition that warranted their use was no longer a threat.

Figure 12:
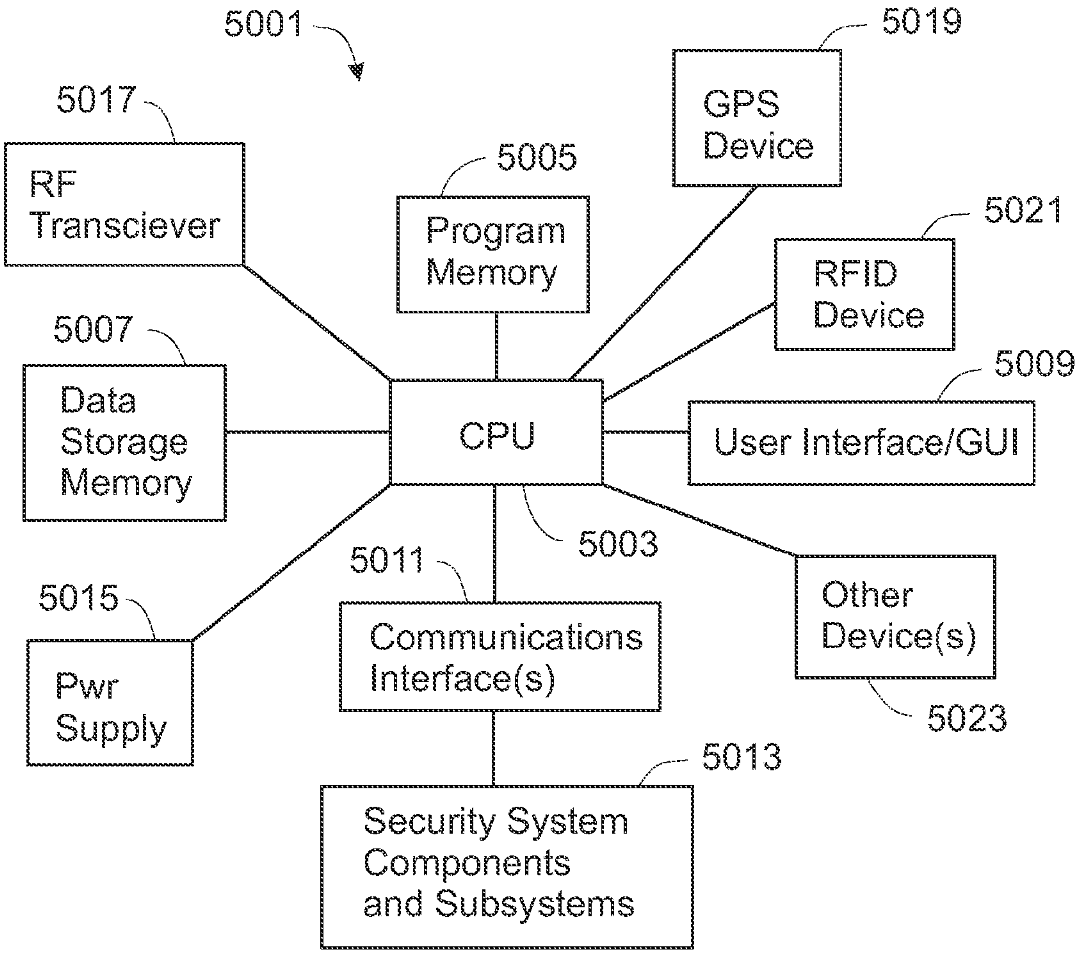
FIG. 12 shows a computer subsystem in block diagram form representing a computing engine and associated components.

FIG. 12 shows a computer subsystem 5001 in block diagram form representing a computing engine and associated components, various combinations of which can be used for various components and subsystems in embodiments of the invention. The computer subsystem 5001 shown comprises a central processing unit (CPU) 5003 in communication connection with program memory 5005, data storage memory 5007, a user interface 5009, any number of communication interfaces 5011, any number of security system components and/or subsystems 5013, a power supply 5015, one or more RF Transceivers 5017, a Global Positioning System (GPS) device 5019, a radio-frequency identification device (RFID device) 5021, and any number of other devices 5023. The program memory (which is a non-transitory, tangible computer readable storage device) can contain program instructions which the processor can use to execute such routines as a signal processor, a sensor tester, a sensor calibrator, a sensor tuner, a driver, a message sender, a message receiver, a communication stack protocol, an encrypter, a decrypter, an authenticator, a threshold comparer, an inference engine, a statistical analyzer, and other instructions by which to execute rules and other routines necessary to carry out the functions described for various subsystems. The user interface 5009 can comprise a graphical user interface (GUI) or other human interface devices such as a keypad or keyboard, a touch-screen, one or more knobs, one or more pushbuttons, and any of a variety of one or more LED's, numeric displays, and/or other display devices. Such a user interface may permit maintenance, service personnel, and/or others to access the workings of a subsystem by requiring entry of a security code, user name, and/or password. Such use and entry may also be required to correlate in time within a pre-scheduled event period entered at a higher-level subsystem such as a NOC. Any use and entry made in this fashion, in some embodiments, is logged and transmitted to the controlling NOC for creating an audit trail, and this trail would include any failure messages and acknowledgements from message recipients. The user interface 5009 may also serve as a mini-NOC user interface, in some embodiments, on one or more of the possible subsystem in the security system 11. A minimum set of subsystem elements comprised by a computer subsystem 5001 would include at least the CPU 5003, the program memory 5005, the data storage memory 5007, the power supply 5015, and at least one of the communication interfaces 5011. One notable use for the data storage memory 5007 is for archiving data that can thereafter be made available for forensic purposes or evidence following a terrorist incident that might have cut-off the sensor subsystem from the rest of the security system. The one or more communications interfaces can be of any kind. The security system components and subsystems 5013 can be any one or more of sensor subsystems (autonomous or not), concentrator subsystems (autonomous or not), monitor and control servers, alarm servers, countermeasure servers, network operations center servers, tactical operations center servers, or other servers or devices. Any or all of the communications interfaces 5011 can be used to communicate data and/or control signals, and any or all of the communications made over these interfaces can be encrypted and require the exchange security identification signatures and/or codes. The power supply 5015 can be a dedicated one or can be a shared source of power as from a power distribution system, or from a back-up power system. The power supply 5015 could be solely or partly comprised of a solar cell, a fuel cell, a chemical battery, or a generator of power operating off of wind, thermal differences, mechanical vibrations, or ambient electro-magnetic waves. Any energy storage component of the power supply 5015 could be rechargeable by way of inductive coupling to a charging source. The RF transceiver 5017 can be of any type and can even be a transceiver of other than radio-frequency electromagnetic signals, for example of light or sound signals. A GPS device 5019 can provide location information which the CPU 5003 can communicate by way of the transceiver 5017 or the communication interfaces 5011 to other security components. GPS information can be used to keep track of the location of the computer subsystem 5001, and can be used to provide location information useful in locating a security threat. Falsified GPS information can also be used as purposeful misinformation for stealth and deception as when advantageous to protect the security of the secure region 105. An RFID device 5021 can provide identification information of the computer subsystem 5001 independently of identification information stored within the data storage memory 5007 or program memory 5005, and can provide identification information directly to external devices that come within the proximity of the RFID device. Other devices 5023 can include such devices as a sensor probe, a watch-dog timer, a snooze or sleep timer, a disturbance emitter, a signal processor, or a weapon. RFID devices can also be controlled to provide deceptive information when advantageous to the security of the secure region 105.

Various embodiments of the invention include means that are sensory, adaptive, stealthy, and/or autonomous. For example, within FIG. 9 and FIG. 10, the steps 2015 and 3011 to "transmit information to a targeted recipient" can have the targeted recipient changed to other than a default preferred targeted recipient. Reasons for such a change may include that a first preferred targeted recipient is temporarily under maintenance or being repaired, is damaged, or is suspected to be compromised by terrorist activity. Other reasons for such a change may be that by doing so may confound eavesdroppers by effectively re-routing information from normal routes. But such changes in the routing of information (e.g. messages) aren't limited to routings between sensors, concentrators, and monitor and control systems. Such changes can extend to changing from otherwise expected routes used between any of the other component subsystems comprised by the security system 11 or shown in FIG. 1 or any of FIGS. 5-7. With the help of FIG. 8, it can also be appreciated that embodiments of the invention may involve the purposeful changing of media, communication link technologies, and/or communications technology attributes dynamically in order to make eavesdropping more difficult. If a localized threat is perceived (correctly or not) by the security system 11, routings can be changed in order to route as much communication away from the location of the perceived threat. As mentioned above, misinformation may also be purposefully transmitted on any of the communication connections for deceiving eavesdroppers, and especially may be utilized and focused to communication routes in the vicinity of a perceived threat that may appear localized. Also as mentioned above, subsystems of the security system 11 may be given autonomous means to enable them to continue operating to collect, analyze, and act independently of other system components which may be temporarily inoperative. As mentioned above in the description of FIG. 1, embodiments of the invention may include the use of decoys (e.g. mis-information honey-pots) to lure and/or trap those who attempt to breach security of the security system 11. Examples of decoys that can be part of an embodiment of the invention include a sensor 211 hidden in a plant or disguised as a plant, a sensing subsystem or device 213 that is real or masquerading as real, and a sensor subsystem 217 hidden in a tree (or disguised as a tree). Any sensor, device, or event that purposely provides or causes misinformation (or that is a purposefully inoperable countermeasure subsystem) may serve as a decoy in the present invention. Some decoys of the current invention may be a device, communication, or event that can distract in order to conceal what is desired to be kept secure, or in order to distract terrorists or other potential assailants) away from the secure area 105. Such decoys can be completely passive or they can be active and even autonomous. A decoy within an embodiment of the invention can also be more than a single subsystem or device; for example, a decoy can be two or more sensors and/or countermeasure subsystems (and/or communications) coordinated in their locations and actions. For example, a surveillance camera 153 can be made to observe activity near to the decoy subsystem 213 (see FIG. 1), and a countermeasure subsystem (such as gun 163) may in reaction be automatically aiming toward the decoy subsystem 213, all while communicating audible warnings to the potential terror suspect. An example of stealth within an embodiment of the invention is that of dynamically changing the routing and/or normal sequence of successive messages (or information) being transmitted from one system component to another.

Figure 13:
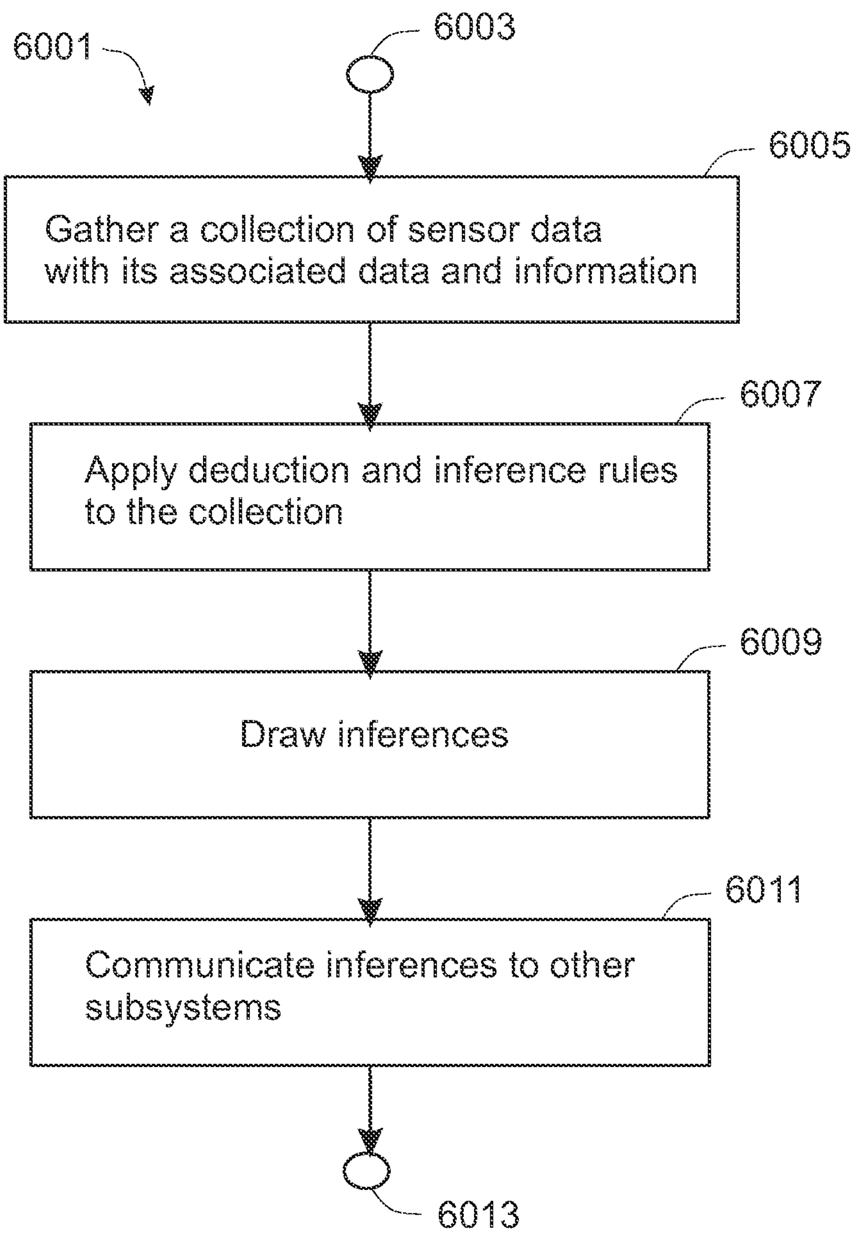
FIG. 13 shows a flow chart of process steps within a method used by some embodiments of the invention to make inferences.

FIG. 13 shows a flow chart of process steps within a method used by some embodiments of the invention to make inferences. These inferences may be based on sensor data or on other data or information available to an embodiment of the invention. The software to execute the analysis steps described under the descriptions of FIGS. 9, 10, and 11 above are stored in program memory 5005 available to a processor (CPU) 5003 as depicted in FIG. 12 above. FIG. 13 shows some steps that may be included in these analysis steps for analysis of sensor data and information through to deducing and inferring new information useful in detecting a terrorist threat, or other threats on the security site 101. Such analyses and deductions might include the use of deduction and inference rules stored within program memory 5005 or within data storage memory 5007. A typical deduction and inference method 6001 (or process) is shown in FIG. 13 to begin with a start 6003 followed by a step 6005 to gather a collection of sensor data with its associated data and information. This is followed by a step 6007 to apply deduction and inference rules to the collection. This is followed by a step 6009 to draw inferences. This is followed by a step 6011 to communicate inferences to other subsystems, most typically a higher-level subsystem in a hierarchy, or directly to a monitoring subsystem (which may be a monitoring and control subsystem). Finally the method can end 6013. One example of such a deduction and inference would be that an object is moving along the length of the barrier wall if sensors within a succession of barrier modules displaced from one another along a common direction pick up a respective succession of disturbance signals with increasing time from one barrier module to the next along the succession of barrier modules. Other examples of a deduction and inference would be a) that a potential threat exists at a specific barrier module having a specific barrier module identification value or GPS-reported location if a sensor within that barrier module detects a disturbance from a norm, but no other nearby sensors detects any disturbances from their respective norms; b) that a vehicle is close to a given barrier module if a spectrophotometer within that barrier module detects one or more above-average signals of the type of gas component(s) expected from a vehicle; c) that a noxious or lethal gas is moving in a given direction if a spectrophotometer detects the gas and a wind indicator detects wind blowing in that given direction; d) that someone is attempting to eavesdrop on communication from a given sensor subsystem, if that communication produces different data being received by any recipient of that data from different communication paths or channels; e) that a terrorist is moving a sensor (or decoy sensor) if the GPS position information coming from it is changing while no prescheduled maintenance is due at the time for that decoy; f) that at least one barrier module has been displaced (given an indication that its GPS coordinates have changed) by a terrorist's attempt to break through the barrier, but that the attempt was apparently unsuccessful because communication by way of a cable running through the tunnels of the barrier modules is still operative, and g) that an attacker has disabled sensors and/or security components (or their subsystems) by damaging or disconnecting one or more sources of electrical power. On a simpler note, sensor subsystems on, within, nearby, or otherwise near enough to have a range that reaches barrier modules of the security barrier 109, collectively provide the security system 11 (i.e. its NOC and TOC centers) with a constant forensic heartbeat on status of its health and alarms, on maintenance issues, moisture detection, unusual power usage, loss of subsystems, etc., any and all of which can be graphically displayed in an organized manner (e.g. utilizing a geographical information system or GIS) at least on NOC browsers 1513 and TOC browsers 1603.

Figure 14:
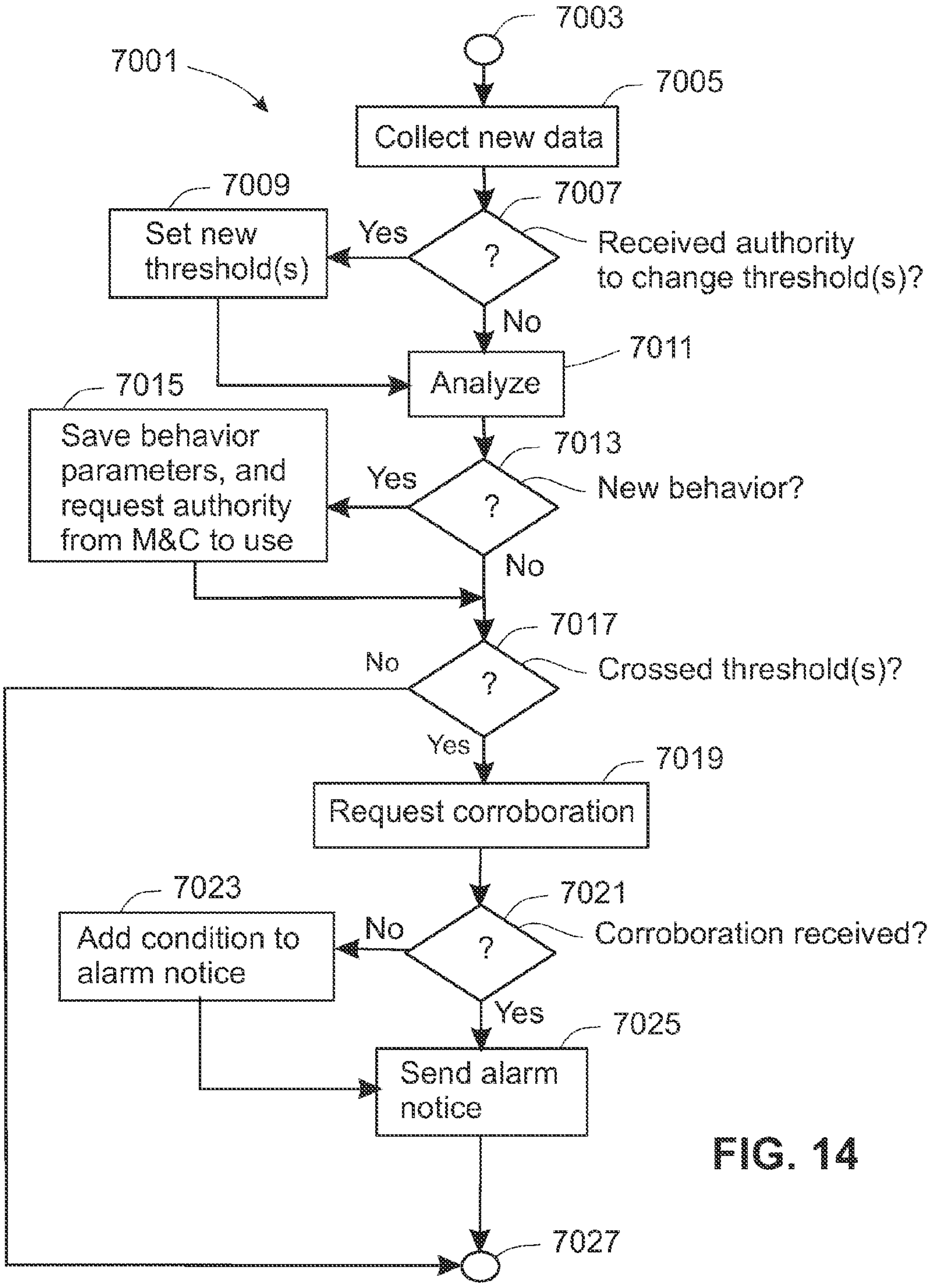
FIG. 14 shows a flow chart of a method used by a sensor subsystem to actively participate in learning improved analysis and decision rules.

FIG. 14 shows a flow chart of a method 7001 used by a sensor subsystem to actively participate in learning improved analysis and decision rules for use in detecting disturbances that could indicate a threat condition, as well as to obtain corroboration(s) from other sensors when potentially meaningful disturbances are detected). The method 7001 could be included within the analysis step 2011 of the method described in FIG. 9, but wherein the collect new data step 7005, and the send alarm notice step 7025, would no longer be needed in this method 7001. The method 7001 begins at a start 7003, followed by the step to collect new data 7005. The collect new data step 7005 is followed by a test 7007 which checks whether the sensor subsystem has received authority to change threshold(s) to be used in the analyze step 7011. The analyze step 7011 follows step 7007 immediately if the authority has not been received. If the authority has been received, a step 7009 is taken to set new threshold(s) before going to the analyze step 7011. The granting or denial of authority which may or may not be received is that coming from a higher-level subsystem to which the sensor has previously made a request for authorization. The analysis step 7011 checks whether the currently obtained or received data exceeds normal thresholds for normal ambient conditions or not. The method 6001 previously described can be at least part of this analysis step 7011 but wherein its final step 6011 to communicate inferences to other subsystems may or may not be performed depending upon secondary objectives of the analysis in step 7011. After this analysis step 7011, a test 7013 is made of whether the new data indicates new behavior not previously recorded. If such behavior is noticed, then characterizing parameters (and even the raw data such as images from a camera) are saved in the step 7015 to save behavior parameters, and to request authority from a Monitoring and Control subsystem to use these parameters next time in its analyze step 7011. Whether new behavior is experienced or not, these steps are followed by a test step 7017 to check whether the new data has crossed critical thresholds. The method 7001 ends 7027 if no threshold has been crossed, but continues to a step 7019 to request corroboration from other subsystems if at least one threshold has been crossed. Of particular note, the request corroboration step 7019 can not only request reports from one or more other sensors, but can effect induced disturbances which may add to the strength of a sensor's signals. These induced disturbances can be caused by directives from the sensor (or a concentrator, or an NOC) to activate certain countermeasures (or emissions from other subsystems such as instances of a boundary sentry 8017 described with respect to FIG. 15 below). The induced disturbances may be purposefully timed to be before or during the one or more other sensors' collection of that new data. If the induced disturbance(s) is/are unexpected in an absence of an intruder, then the validity of the original sensor data is confirmed as indicating a potential threat, or otherwise as not indicating a potential threat. Step 7009 is followed by a test step 7021 to check whether or not corroboration has been received from another subsystem. If corroboration has not been received, then step 7023 adds a condition to an alarm notice to that effect. In either regard, the following step 7025 is that of sending the alarm notice to a higher-level subsystem. Following step 7025, the method 7001 ends at 7027.

Figure 15:
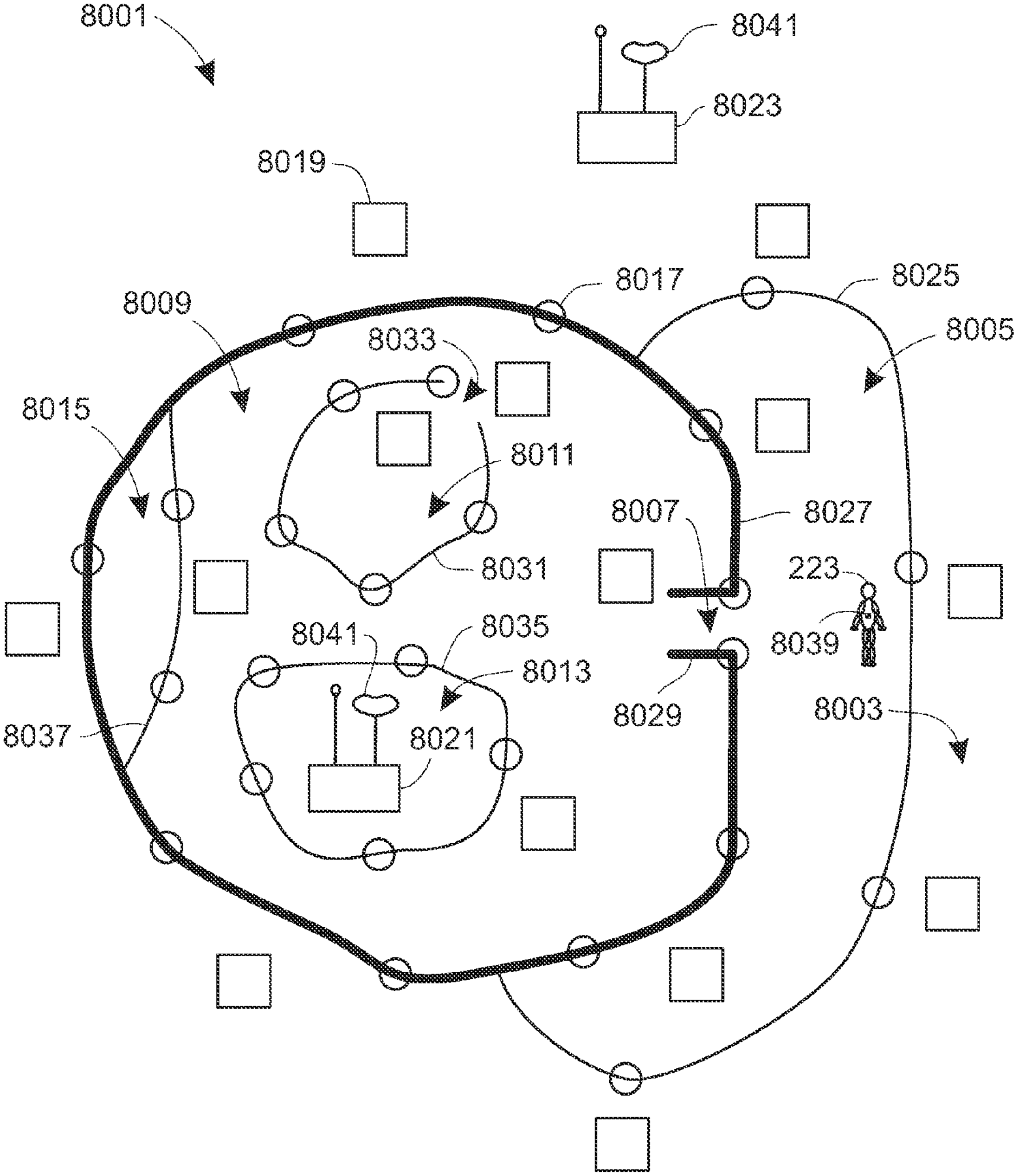
FIG. 15 shows a diagrammatic plan-view representation of a security site.

FIG. 15 shows a diagrammatic plan-view representation of a security site 8001, a portion of the site 8001 of which was more fully shown in perspective in FIG. 1 as security site 101. An outer zone 8003 is unprotected by the site 8001. A buffer zone 8005 is situated between the outer zone 8003 and a protected zone 8009. An entry gate zone 8007 shows a place of secured access for people and vehicles moving between the buffer zone 8007 and the protected zone 8009. Within the protected zone 8009 and representing portions of the protected zone 8009, are three other zones: a first special zone 8011, a second special zone 8013, and a third special zone 8015. At one or more locations at the boundaries between zones, a border sentry 8017 (represented as a circle) and/or a check station 8019 (represented as a square) is/are shown. A first security center 8021 is located within the second special zone 8013. A second security center 8023 is shown located outside the buffer zone 8005. A first boundary 8025 is shown separating the outer zone 8003 from the buffer zone 8005. A second boundary 8027 is shown separating the buffer zone from the protected zone 8009, however a gap in the boundary between the buffer zone 8025 and the protected zone 8009 is occupied by an entry gate zone 8007 which is itself partially bounded by a third boundary 8029. This second boundary 8027 would be defined by placement of a row of armored barrier modules and is depicted within FIG. 15 as a thicker line than used elsewhere in the drawing. Side boundaries of the entry gate zone 8007 may also comprise armored barrier modules, so those (such as third boundary 8029) are drawn with the same thicker line. The first special zone 8011 within the protected zone 8009 is bordered by a fourth boundary 8031 and a fifth boundary 8033, wherein the fifth boundary 8033 is a gap within the fourth boundary 8031 and serves as an entrance and exit gateway to and from the first special zone. The fourth boundary 8031 may, for example, comprise a high-voltage fence or a high armored wall on a high embankment around the first special zone 8011. The second special zone 8013 within the protected zone 8009 is bordered by a sixth boundary 8035 which may comprise, for example, a high reinforced concrete wall, as well as one or more security-guard guarded entrance and exit door(s). The third special zone 8015 within the protected zone 8009 is bordered partially by a seventh boundary 8037 and partially by a portion of the second boundary 8027, wherein the seventh boundary 8037 may be, for example, a chain-link fence with locked entrance and exit gates. A person 223 is shown standing in the buffer zone 8005 not far from the entry gate zone 8007. The person is shown carrying one or more personal device(s) 8039. The First Security Center 8021 and the second security center 8023 are each shown with a radar antenna 8041.

In some embodiments of the invention, no level of security clearance may be required for a person, vehicle, or other equipment to be within the outer zone 8003 shown in FIG. 15. The level of security clearance required to be in the buffer zone 8005 may be low but requiring at least some minimum show of credentials. The level of security clearance required to be within the entry gate zone 8007 can be higher than that of the buffer zone 8005, but a still higher level of security clearance is normally required within the protected zone 8009. A still higher level of security clearance could be required within the first special zone 8011. Between the levels of security clearance required to be within the protected zone 8009 and also within the first special zone 8011, can be intermediate levels of security clearance to be within other special zones such as the second special zone 8013 and the third special zone 8015. This example might be appropriate for a nuclear power plant where the power generation facility is within the first special zone, the management and staff offices within the second special zone 8013, and the maintenance yard within the third special zone 8015.

FIG. 15 shows multiple instances of the use of a border sentry 8017 (represented as a circle) and/or a check station 8019 (represented as a square) at the boundaries between zones. Numerous instances of a border sentry 8017 are shown on each boundary, with those on each boundary somewhat uniformly distributed apart from one another along the entire length of that boundary. Not far from each instance of a border sentry 8017 can be found an instance of a check station 8019. A border sentry 8017 is a type of disturbance emitter and can emit some form of communication (such as one or more audible voice announcements and/or warnings, distractingly loud noises, or bright flashes of light) that would normally be noticed by an intruder or by a non-hostile person detected by one or more of the sensor subsystems of the security system 11. Depending upon the situation of how much the security system 11 may be able to determine about a suspected intruder, the security system 11 has the option to activate any given instance of a border sentry 8017; the option to reveal to a suspected intruder that he has been discovered (in certain locations) may be important especially if lethal countermeasures may be employed. Announcements, warnings, or instructions, when given would be given in multiple languages depending on the region. The announcements may provide instructions to check-in at a specific instance of a check station 8019 or just a nearby instance of a check station 8019. In some situations where foul play is suspected, the information given out by an instance of a border sentry could be purposefully false information designed to confuse an intruder. An instance of a check station 8019 is a means for a person receiving such a communication to check in with the security system 11 that they have the appropriate security clearance to be within the zone they are currently, or that they have the appropriate security clearance to approach and enter the next zone requiring the next higher level security clearance. The check-in process may involve a series of challenges for correct responses such as for a password, for an iris scan, for the person's weight, for the person's name, or other shows of identity and/or credentials. These instances of a check station 8019 may utilize the same diversities in communication with the rest of the security systems networks as other subsystems within the security system 11. Just inside the entry gate zone 8007 is shown an instance of a check station 8019 that would be associated with two instances of a border sentry 8017 found one on each side of the entry gate zone 8007; it is usual that this instance of a check station 8019 would be attended by one or more security guards to double-check and assist persons entering or leaving the protected zone 8009. The person 223 shown standing in the boundary zone 8005 is shown carrying one or more personal devices 8039; these personal devices may, for example, be one or more of the following: a GPS device, an RFID device, a cell-phone, a secure-ID card, or any wireless device that can help to identify the person to the security system 11. Any one or more of these devices may be required, or may just serve to help the person 223, to check in or register with any given instance of a check station 8019, and some may aid in permitting the security system 11 to physically and/or logically track the movement of the person about the security site 8001. These personal devices 8039, in addition to a person's registering with the instances of a check station 8019, can permit a person 223 to safely cross into a zone of next higher security, but their entry may still be cautionary and produce accorded alarms as relating to a person with assumed adequate credentials, but not fully assured as being legitimate. Within this disclosure, the aforementioned boundary system utilizing instances of a boundary sentry 8017 and a check station 8019 to afford a person's safe passage through both hard and soft boundaries to zones of increased security level can be referred to as a "MOATS" system, where "MOATS" is an acronym for "monitored-offensive-automated-threat-system.

As seen in FIG. 15, radar and any other sensor device and subsystem for monitoring air-space above and around the security site 8001 may be made a part of the security system 11. The first security center 8021, within the second special zone 8013, is shown to include a radar antenna 8041, as is the second security center 8023 shown outside the buffer zone 8005. A radar subsystem using one or more instances of a radar antenna 8041 can give the security system 11 the capability of detecting and tracking the location and motion of one or more ground targets as well as targets in the air, and wherein the target may be a suspected terrorist perhaps in a vehicle or airplane or even on foot.

The security system 11 protecting the security site 8001 shown in FIG. 15 may include failsafe features. Sensor and countermeasure subsystems that fail can be made to automatically become inoperative should self-checking of their operating health fail to reset a hold on a respective automatic shut-down function. In addition subsystems such as sensor subsystems, concentrator subsystems, countermeasure subsystems, and network operation centers, can check the health of one-another through back-and-forth messaging to request transmissions of information that would be sufficient to guarantee that the other subsystem is continuing to be operational and in good health. (Within this disclosure, what is meant by a subsystem's health is that its software and hardware operate as they were designed to operate.) Other examples of fail-safe design within embodiments of the invention may include the ability of one or more security centers (like the second security center 8023) situated outside the security site 8001 to continually check on the health of the security site 8001 and security system 11 by means of communications with the first security center 8021 (that would include an NOC and perhaps a TOC), and to back-up or take over the full or partial roll of the first security center 8021 when necessary, or even to control the security system 11 to shut it and its subsystems down completely (even its autonomously operating subsystems) should it be found that no human operators are present and responsive at the security site 8001. Automatic weapons controlled by the security system 11 (and autonomous weapons which are part of the security system 11) can be made to shut down and become locked by respective fail-safe watch-dog timing functions and their associated apparatuses if the weapon subsystems don't continue to generate signals required to keep themselves alive, and the weapon subsystems don't continue to receive keep-alive signals from higher-level subsystems in the security system 11. Such a situation could result, for example, if no human security persons are alive on the security site 8001 and/or no external security center (such as the second security center 8023) are/is controlling the security system 11. Another fail-safe feature of some of the embodiments of the security system 11 is that of being able to shut down the security of the system by boundaries, for example starting first with subsystems at the first boundary 8025, then the second boundary 8027, then the third boundary 8029, the seventh boundary 8035, the sixth boundary 8033, and the fifth boundary 8031 in succession.

Although the methods for collecting and analyzing sensor data for information meaningful in detecting a terrorist threat to a secure region 105 at a secure site 101 (and 8001) are described as being comprised of various steps (e.g. method of sensor data collection 2001, method 3001 used by a concentrator subsystem, method 4001 used by a monitor and control subsystem, method 6001 used in making deductions and inferences, and method 7001 used by a sensor subsystem to actively participate in learning improved analysis and decision rules as well as to obtain corroboration(s) from other sensors when potentially meaningful disturbances are detected), fewer or more steps may comprise the process and still fall within the scope of various embodiments.

Several embodiments are specifically illustrated and/or described herein. However, it will be appreciated that modifications and variations are covered by the above teachings and within the scope of the appended claims without departing from the spirit and intended scope thereof. For example, communications links between various subsystems can use any of various interfacing methods and protocols (and/or various encryption methods) and be arranged in various other networking architectures; communications networks may overlap one-another; analysis steps can reset data and information memory; and monitor and control subsystems can report to higher level systems such as a Tactical Operations Center and a Network Operations Center at the same site or at sites different from the site hosting the armored security system. Method steps described herein may be performed in alternative orders. Various embodiments of the invention include programs and/or program logic stored on non-transitory, tangible computer readable media of any kind (e.g. optical discs, magnetic discs, semiconductor memory). System structures and organizations described herein may be rearranged. Various embodiments of the invention can include interconnections of various types between various numbers of various subsystems and sub-components. The examples provided herein are exemplary and are not meant to be exclusive.

Although specific embodiments of the invention have been illustrated and described herein, those of ordinary skill in the art will appreciate that any arrangement configured to achieve the same purpose may be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Some aspects of the invention are listed in the following paragraph.

We claim:

1. A network comprising:

a. a computer; and b. a computerized sensor;

wherein the computerized sensor is protected within concrete or steel components of a physical security barrier and is communicatively connected to the computer and configured to communicate messages containing sensor data to the computer;

wherein paths, channels, and/or other communications technologies used to link the computerized sensor to the computer are switched automatically and autonomously by the computerized sensor; and wherein at least some of the messages are sent by the computerized sensor at pseudo-randomly selected times known in advance by both the computer and the computerized sensor.

2. The network of claim 1, further comprising: multiple communications media;

wherein each of the messages is communicated from the computerized sensor to the computer over two or more of the communications media; and wherein not all of the messages are communicated from the computerized sensor to the computer over the same two or more communications media.

3. The network of claim 1, further comprising:

a. multiple digital-communications media; and b. an interlinked chain of concrete barrier modules, wherein each module comprises a hole through that module, and wherein each module comprises a steel beam that extends movably through the respective hole of that module;

wherein the steel beam of at least one of the modules is rotatable coupled to a respective steel beam of each of two adjacent modules that are located next to the at least one of the modules; and wherein at least one of the multiple digital-communications media is routed along a path extending through at least the respective holes of the at least one of the modules and the two adjacent modules.

4. The network of claim 3, wherein the computerized sensor is a continuity sensor configured to sense a physical breach of the chain of concrete barrier modules; and wherein the computerized sensor comprises at least a portion of the at least one of the digital-communications media that is routed through the respective holes of the at least one of the modules and the two adjacent modules.

5. The network of claim 1, further comprising: multiple communications paths;

wherein each of the messages is communicated from the computerized sensor to the computer over two or more of the communications paths; and wherein not all of the messages are communicated from the computerized sensor to the computer over the same two or more of the communications paths.

6. The network of claim 1, further comprising: multiple communications channels;

wherein each of the messages is communicated from the computerized sensor to the computer over two or more of the communications channels; and wherein not all of the messages are communicated from the computerized sensor to the computer over the same two or more of the communications channels.

7. The network of claim 1, further comprising: multiple communications technologies.

8. The network of claim 1, further comprising: multiple communications link technologies.

9. The network of claim 1, further comprising: multiple communications protocols.

10. The network of claim 1, further comprising: multiple communications technology attributes each with one selected from the group consisting of multiple communications media, multiple communications paths, multiple communications channels, multiple communications technologies, multiple communications link technologies, and multiple communications protocols.

11. The network of claim 1, wherein the computerized sensor and computer that are communicatively connected for communicating messages containing sensor data are communicatively connected by means of multiple networks some of which do not share any communications paths with one-another.

12. The network of claim 1, wherein the computer is one selected from the group consisting of a linked concentrator, a sensor server, a network node, a router, an alarm server, a monitor-and-control subsystem, a network operations center, and a tactical operations center.

13. The network of claim 1, wherein communications from the computerized sensor to the computer begin at times known in advance by the computer.

14. A network comprising:

a. a computer; and b. a computerized sensor;

wherein the computerized sensor is protected within concrete or steel components of a physical security barrier and is communicatively connected to the computer and configured to communicate messages containing sensor data from the computerized sensor to the computer over one or more provisioned channels, paths, and/or communications technologies selected automatically and randomly by the computerized sensor; and wherein the computerized sensor initiates messages at randomly selected times known in advance by both the computer and the computerized sensor.

15. The network of claim 14, further comprising: multiple communications media;

wherein each of the messages is communicated from the computerized sensor to the computer over two or more of the communications media; and wherein not all of the messages are communicated from the computerized sensor to the computer over the same two or more of the communications media.

16. The network of claim 14, further comprising:

a. multiple digital-communications media; and b. an interlinked chain of concrete barrier modules, wherein each module comprises a hole through that module, and wherein each module comprises a steel beam that extends movably through the respective hole of that module;

wherein the steel beam of at least one of the modules is rotatably coupled to a respective steel beam of each of two adjacent modules that are located next to the at least one of the modules; and wherein at least one of the multiple digital-communications media is routed along a path extending through at least the respective holes of the at least one of the modules and its two adjacent modules.

17. The network of claim 16, wherein the computerized sensor is a continuity sensor configured to sense a physical breach of the chain of concrete barrier modules; and wherein the computerized sensor comprises at least a portion of the at least one of the digital-communications media that is routed through the respective holes of the at least one of the modules and the two adjacent modules.

18. The network of claim 14, further comprising: multiple communications paths;

wherein each of the messages is communicated from the computerized sensor to the computer over two or more of the communications paths; and wherein not all of the messages are communicated from the computerized sensor to the computer over the same two or more of the communications paths.

19. The network of claim 14, further comprising: multiple communications channels;

wherein each of the messages is communicated from the computerized sensor to the computer over two or more of the communications channels; and wherein not all of the messages are communicated from the computerized sensor to the computer over the same two or more of the communications channels.

20. The network of claim 14, further comprising: multiple communications technologies.

21. The network of claim 14, further comprising: multiple communications link technologies.

22. The network of claim 14, further comprising: multiple communications protocols.

23. The network of claim 14, further comprising: multiple communications technology attributes each with one selected from the group consisting of multiple communications media, multiple communications paths, multiple communications channels, multiple communications technologies, multiple communications link technologies, and multiple communications protocols.

24. The network of claim 14, wherein the computerized sensor and computer that are communicatively connected for communicating messages containing sensor data are communicatively connected by means of multiple networks some of which do not share any communications paths with one-another.

25. The network of claim 14, wherein the computer is one selected from the group consisting of a linked concentrator, a sensor server, a network node, a router, an alarm server, a monitor-and-control subsystem, a network operations center, and a tactical operations center.

26. The network of claim 14, wherein communications from the computerized sensor to the computer begin at times known in advance by the computer.

27. A method of providing security comprising the steps of:

a. providing:

i. multiple digital-communications media; and ii. an interlinked chain of concrete barrier modules, wherein each module comprises a hole through that module, and wherein each module comprises a steel beam that extends movably through the respective hole of that module;

wherein the steel beam of at least one of the modules is rotatably coupled to a respective steel beam of each of two adjacent modules that are located next to the at least one of the modules;

wherein at least one of the multiple digital-communications media is routed along a path extending through at least the respective holes of the at least one of the modules and the two adjacent modules;

wherein the at least one of the multiple digital-communications media connects a computerized sensor to a computer installed within one of the holes and messages containing sensor data are communicated from the computerized sensor to the computer over one or more provisioned channels, paths, and/or communications technologies of the multiple digital-communications media selected automatically and randomly by the computerized sensor;

wherein the computerized sensor initiates the communication of messages at randomly selected times known in advance by both the computer and the computerized sensor; and b. generating a breach alarm when communication of messages along the path becomes disabled.

* * * * *